United States Patent
Yoon et al.

(10) Patent No.: US 12,199,654 B2
(45) Date of Patent: Jan. 14, 2025

(54) ANTENNA AND ELECTRONIC DEVICE COMPRISING THE SAME

(71) Applicant: Samsung Electronics Co., Ltd., Gyeonggi-do (KR)

(72) Inventors: Shinho Yoon, Gyeonggi-do (KR); Taeyoon Seo, Gyeonggi-do (KR); Myeongjun Kong, Gyeonggi-do (KR); Taeik Kim, Gyeonggi-do (KR); Donjun Oh, Gyeonggi-do (KR); Soonho Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 333 days.

(21) Appl. No.: 17/721,581

(22) Filed: Apr. 15, 2022

(65) Prior Publication Data
US 2022/0329278 A1    Oct. 13, 2022

Related U.S. Application Data

(63) Continuation of application No. PCT/KR2022/005184, filed on Apr. 11, 2022.

(30) Foreign Application Priority Data

Apr. 12, 2021   (KR) .................. 10-2021-0047267

(51) Int. Cl.
*H04B 1/38* (2015.01)
*H04B 1/3827* (2015.01)

(52) U.S. Cl.
CPC ................... *H04B 1/3838* (2013.01)

(58) Field of Classification Search
CPC .. G09F 9/30; G09F 9/301; H01Q 1/24; H01Q 1/243; H01Q 1/38; H04B 1/005; H04B 1/3838; H04B 7/0408
See application file for complete search history.

(56) References Cited

U.S. PATENT DOCUMENTS 9,258,396 B2   2/2016 Hwang
10,978,795 B2 *  4/2021 Chen .................. H01Q 21/28
(Continued)

FOREIGN PATENT DOCUMENTS

CN    108594934    6/2020
EP    4 246 714    9/2023
(Continued)

OTHER PUBLICATIONS

International Search Report dated Jul. 18, 2022 issued in counterpart application No. PCT/KR2022/005184, 13 pages.
(Continued)

*Primary Examiner* — Siu M Lee
(74) *Attorney, Agent, or Firm* — The Farrell Law Firm, P.C.

(57) ABSTRACT

An antenna and an electronic device including the same are provided. The electronic device includes a first housing including a first conductive portion through a portion of a side surface and including a first space, a second housing slidable along a first direction from the first housing, a flexible display including at least a partially variable display area when transitioning from a slide-in state to a slide-out state, and a wireless communication circuit disposed in the first space and configured to transmit or receive a wireless signal in a frequency band through the first conductive portion. The first conductive portion includes a first portion having a first length along the first direction, a second portion spaced apart from the first portion at a predetermined interval and having a second length in the first direction, and a third portion connecting to a first end of the first portion and a first end of the second portion. The frequency band is determined based on a third length extending from the first portion, through the third portion, to the second portion.

17 Claims, 31 Drawing Sheets

(56) References Cited

U.S. PATENT DOCUMENTS

| | | | |
|---|---|---|---|
| 11,204,629 B1 * | 12/2021 | Kwak | H04M 1/0268 |
| 11,450,960 B2 * | 9/2022 | Hwang | H01Q 9/42 |
| 2004/0046699 A1 | 3/2004 | Amano et al. | |
| 2011/0275333 A1 | 11/2011 | Kim et al. | |
| 2018/0366813 A1 | 12/2018 | Kim et al. | |
| 2020/0007184 A1 * | 1/2020 | Jung | H04B 1/525 |
| 2020/0343643 A1 * | 10/2020 | Zhang | H01Q 1/38 |
| 2020/0356142 A1 | 11/2020 | Wang | |
| 2020/0373654 A1 * | 11/2020 | Shukutani | H01Q 1/36 |
| 2021/0021017 A1 | 1/2021 | Li et al. | |
| 2021/0219437 A1 * | 7/2021 | Kim | H04M 1/0237 |
| 2022/0103668 A1 | 3/2022 | Kim et al. | |
| 2022/0321687 A1 | 10/2022 | Kong et al. | |

FOREIGN PATENT DOCUMENTS

| | | |
|---|---|---|
| JP | 3713476 | 8/2005 |
| KR | 1020100018750 | 2/2010 |
| KR | 1020110123995 | 11/2011 |
| KR | 1020120119834 | 10/2012 |
| KR | 1020170056246 | 5/2017 |
| KR | 1020170066944 | 6/2017 |
| KR | 1020190143029 | 12/2019 |
| KR | 1020200098857 | 8/2020 |

OTHER PUBLICATIONS

European Search Report dated Jun. 4, 2024 issued in counterpart application No. 22788367.5-1201, 13 pages.

* cited by examiner

ANTENNA AND ELECTRONIC DEVICE COMPRISING THE SAME

CROSS-REFERENCE TO RELATED APPLICATIONS

This application is a Bypass Continuation Application of International Application No. PCT/KR2022/005184, which was filed on Apr. 11, 2022, and is based on and claims priority under 35 U.S.C. § 119 to Korean Patent Application No. 10-2021-0047267, which was filed in the Korean Intellectual Property Office filed on Apr. 12, 2021, the entire disclosure of each of which is incorporated herein by reference.

BACKGROUND

1. Field

The disclosure relates generally to an antenna and an electronic device including the same.

2. Description of the Related Art

Electronic devices are gradually becoming slimmer with increased rigidity and strengthened design aspects. At the same time, electronic devices are being developed so that their functional elements are differentiated. For example, some electronic device designs are moving away from a uniform rectangular shape and are gradually being transformed into various shapes.

An electronic device may also have a deformable (e.g., foldable or bendable) structure that is capable of using a large-screen display while still being convenient to carry. For example, as part of the deformable structure, the electronic device may have a rollable structure or a slidable structure that is capable of changing the display area of the flexible display through the use of housings that slide with respect to each other. Such an electronic device, however, may require an antenna arrangement structure capable of maintaining constant radiation performance regardless of the support structure or the sliding operation of the flexible display.

An electronic device may be a slidable electronic device that is capable of extending a display area when used. The slidable electronic device may include a first housing (e.g., a first housing structure, a base housing, a base bracket, or a base structure) and a second housing (e.g., second housing structure, slide housing, slide bracket, or slide structure), which can be movably coupled to one another in an at least a partially fitted together manner. For example, the first housing and the second housing as slidably operated with respect to each other and supporting at least a part of a flexible display (or expandable display) may induce, in a slide-in state, the flexible display to have a first display area, and may induce, in a slide-out state, the flexible display to have a second display area that is larger than the first display area.

An electronic device may include a conductive portion that is segmented through at least one non-conductive portion as a portion of the first housing and the second housing and is used as an antenna. Conductive portions may be configured through the first housing, except for the operation area in which the flexible display is variable and at least a portion of a first side surface, a second side surface, and a third side surface connecting the first side surface and the second side surface of the second housing.

However, it may be difficult to provide sufficient electrical length to operate in the low band because these conductive parts should be designed without interference in consideration of the operating area between the housings operating in a sliding manner with respect to each other. In order to satisfy such an electrical length, when at least a portion of the conductive portion extends to a portion supporting a portion of the flexible display, radiation performance degradation due to proximity of a conductive structure (e.g., a conductive plate) of the flexible display may occur.

SUMMARY

The disclosure is provided to address at least the above-mentioned problems and/or disadvantages and to provide at least the advantages described below.

An aspect of the disclosure is to provide an antenna and an electronic device including the same, which have a sufficient electrical length to smoothly operate in a low band.

Another aspect of the disclosure is to provide an electronic device including antennas in which radiation performance degradation may be reduced by switching appropriately according to a state of the electronic device, so that interference by a sliding operation structure between housings and a conductive structure of a flexible display is avoided.

In accordance with an aspect of the disclosure, an electronic device is provided, which includes a first housing including a first conductive portion disposed through at least a portion of a side surface and including a first space, a second housing coupled to be slidable along a first direction from the first housing, a flexible display including at least a partially variable display area when transitioning from a slide-in state to a slide-out state, and a wireless communication circuit disposed in the first space and configured to transmit or receive a wireless signal in at least one frequency band through the first conductive portion. The first conductive portion includes a first portion having a first length along the first direction, a second portion spaced apart from the first portion at a predetermined interval and having a second length in the first direction, and a third portion connecting to a first end of the first portion and a first end of the second portion. The at least one frequency band is determined based on a third length extending from the first portion, through the third portion, to the second portion.

In accordance with another aspect of the disclosure, an electronic device is provided, which includes a first side surface including a first conductive portion disposed along a first direction, a second side surface extending from the first side surface in a second direction perpendicular to the first direction, a third side surface extending, in the first direction, from the second side surface, a housing including an inner space formed through a fourth side surface extending from the third side surface to the first side surface, a display, and a wireless communication circuit disposed in the inner space and configured to transmit or receive a wireless signal in at least one frequency band through the first conductive portion. The first conductive portion includes a first portion having a first length along the first direction, a second portion spaced apart from the first portion at a predetermined interval and having a second length in the first direction, and a third portion connecting to a first end of the first portion and a first end of the second portion. The at least one frequency band is determined based on a third length extending from the first portion, through the third portion, to the second portion.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
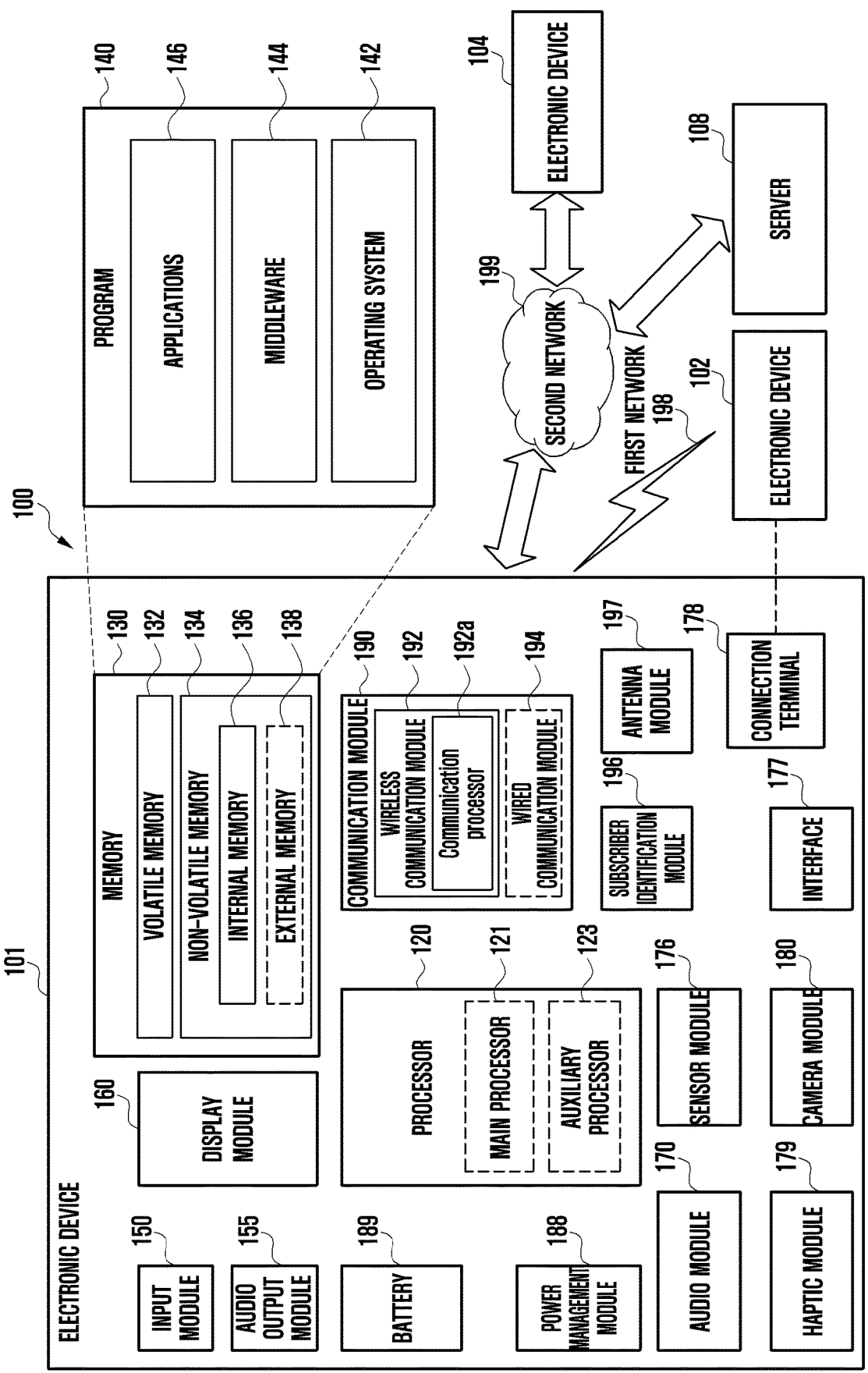
FIG. 1 illustrates an electronic device in a network environment according to an embodiment.

Hereinafter, various embodiments of the disclosure will be described in detail with reference to accompanying drawings. Descriptions of well-known functions and constructions are omitted for the sake of clarity and conciseness.

It should be appreciated that various embodiments of the present disclosure and the terms used therein are not intended to limit the technological features set forth herein to particular embodiments and include various changes, equivalents, or replacements for a corresponding embodiment. Also, a singular form of a noun corresponding to an item may include one or more of the things, unless the relevant context clearly indicates otherwise.

With regard to the description of the drawings, similar reference numerals may be used to refer to similar or related elements.

FIG. 1 illustrates an electronic device in a network environment according to an embodiment.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a image or moving images. The camera module 180 may include one or more lenses, image sensors, ISPs, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a $5^{th}$ generation (5G) network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
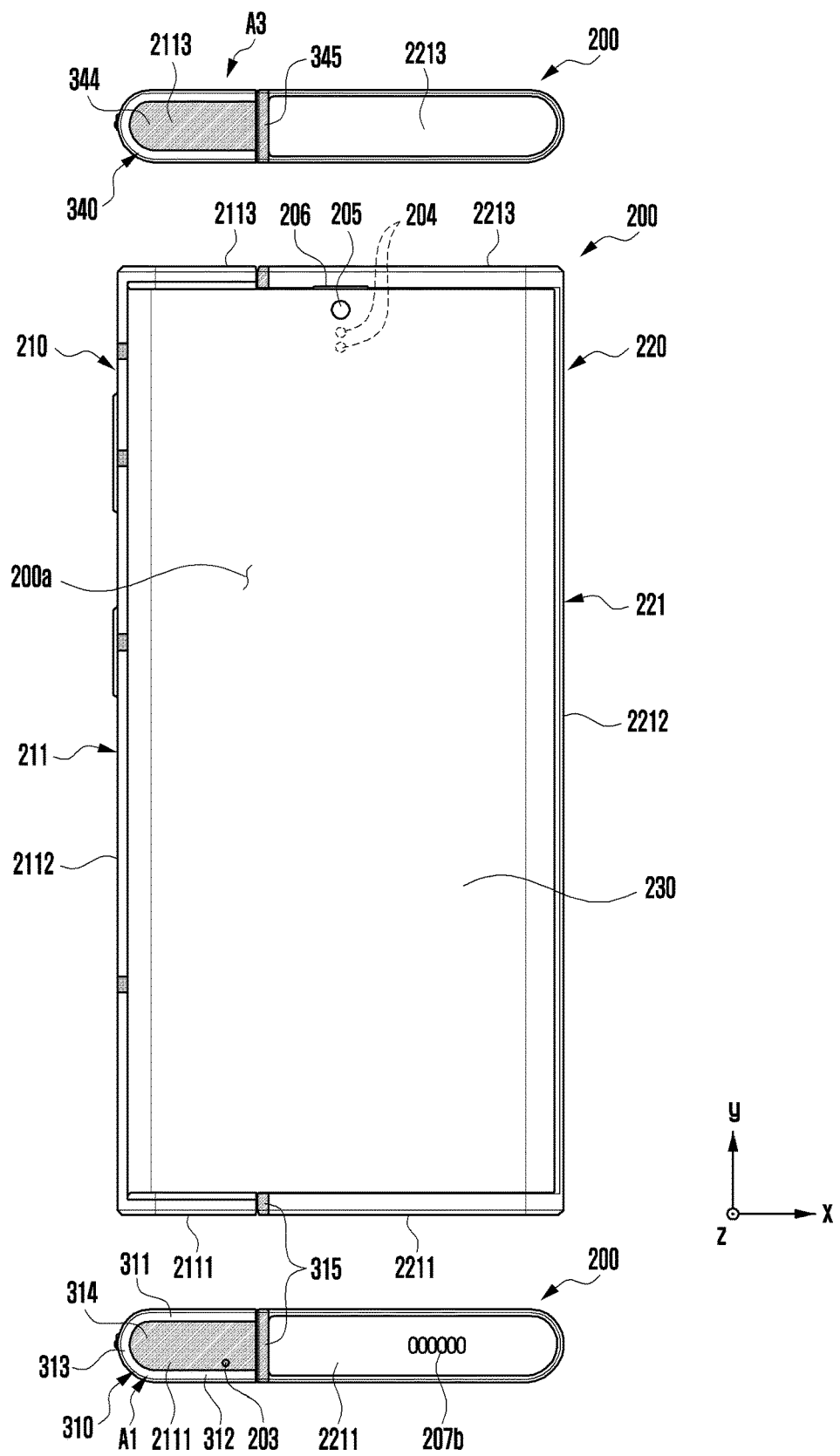
FIGS. 2A and 2B illustrate a front surface of an electronic device in a slide-in state and a slide-out state according to an embodiment.
Figure 2B:
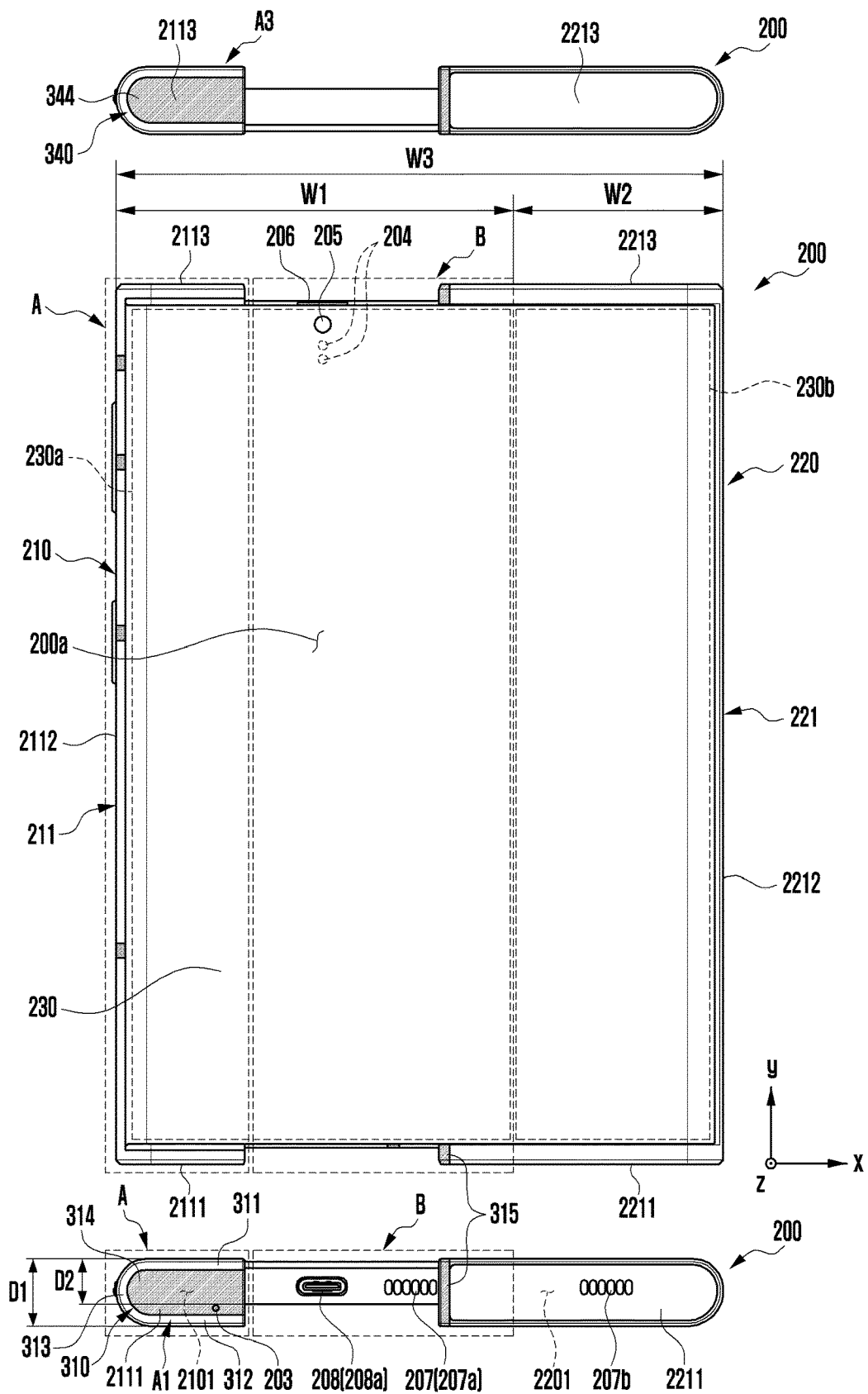
Figure 3A:
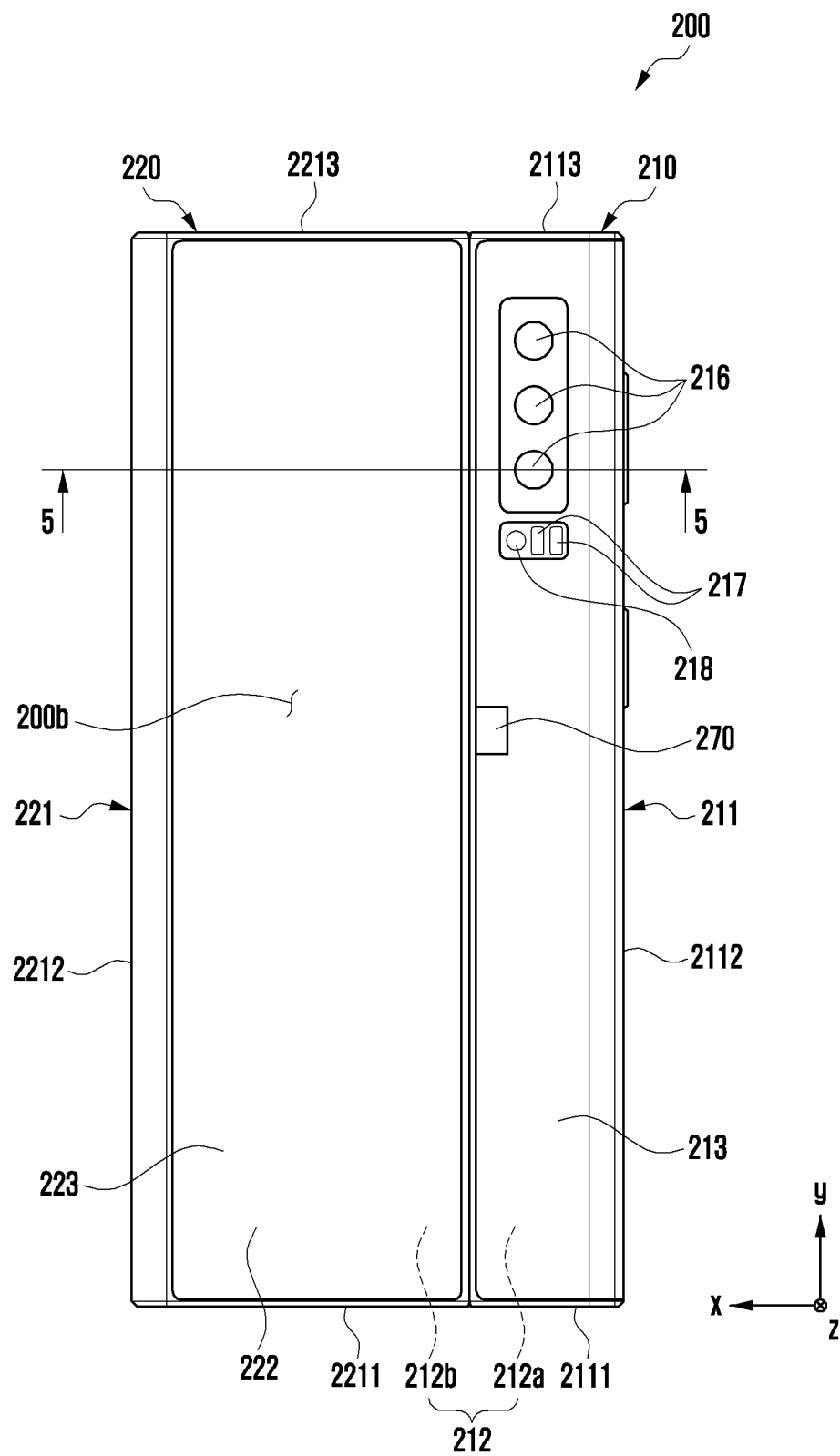
FIGS. 3A and 3B illustrate a rear surface of an electronic device in a slide-in state and a slide-out state according to an embodiment.
Figure 3B:
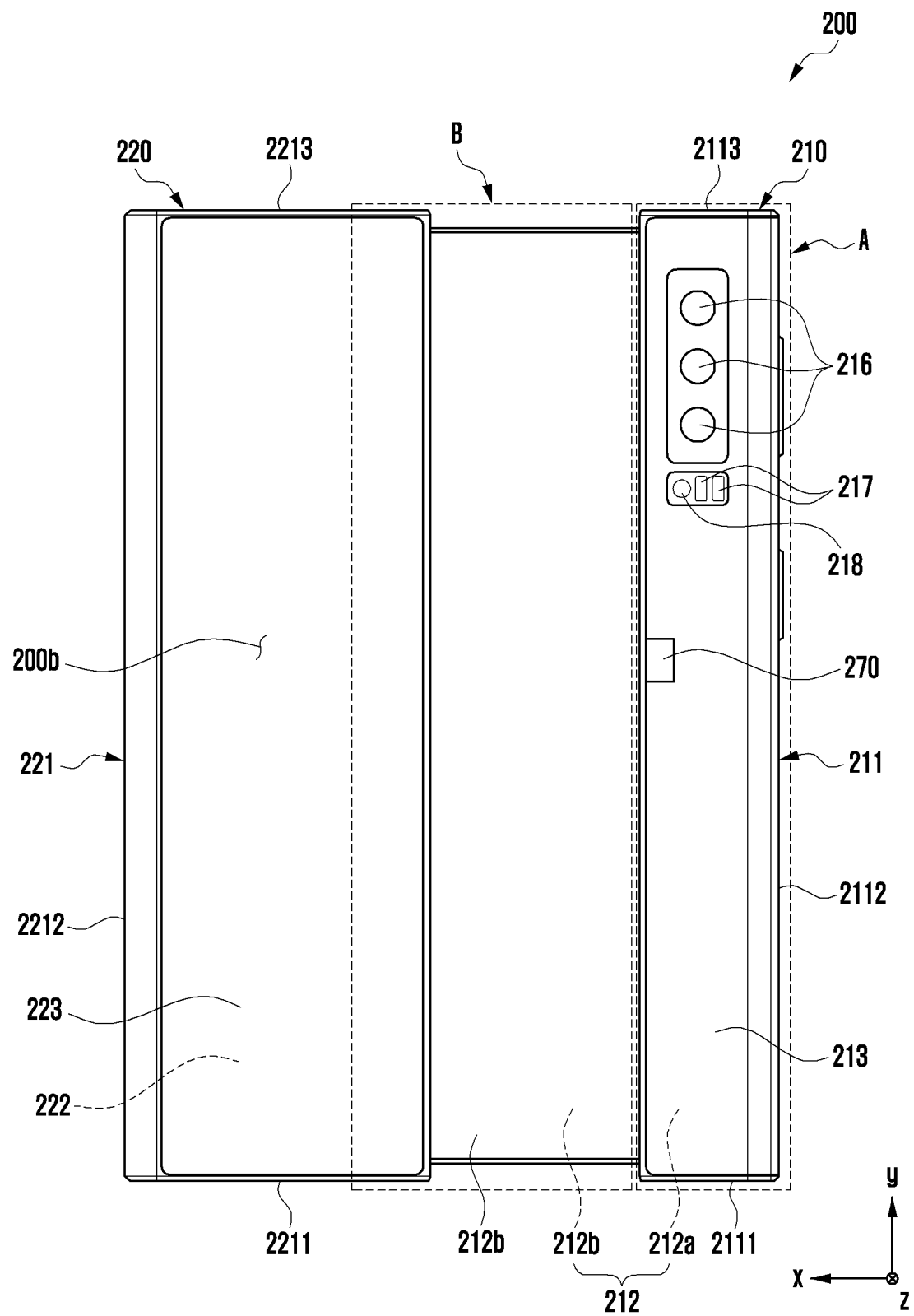

FIGS. 2A and 2B illustrate front and side views of an electronic device in a slide-in state and a slide-out state according to an embodiment. FIGS. 3A and 3B illustrate a rear surface of an electronic device in a slide-in state and a slide-out state according to an embodiment.

The electronic device 200 of FIGS. 2A to 3B may be at least partially similar to the electronic device 101 of FIG. 1 or may further include other embodiments of the electronic device.

Referring to FIGS. 2A, 2B, 3A, and 3B, the electronic device 200 includes a first housing 210 (e.g., a first housing structure or a base housing), a second housing 220 (e.g., a second housing structure or a slide housing) that is movably coupled in a specified first direction (x-axis direction) and a specified reciprocating distance from the first housing 210, and a flexible display 230 (e.g., expandable display) disposed to be supported through at least a portion of the first housing 210 and the second housing 220. The electronic device 200 may include a bendable member or bendable support member (e.g., bendable member 240 of FIG. 5) (e.g., an articulated hinge module) that in a slide-out state at least partially forms the same plane as at least a part of the first housing 210 and in a slide-in state is at least partially accommodated in the inner space of the second housing 220 (e.g., the second space 2201 in FIG. 5). At least a portion of the flexible display 230 is supported by a bendable member (e.g., the bendable member 240 in FIG. 5) in the slide-in state while being accommodated in the inner space (e.g., the second space 2201 of FIG. 5) of the second housing 220. At least a portion of the flexible display 230 may supported by a bendable member (e.g., the bendable member 260 of FIG. 5) forming at least partially the same plane as the first housing 210 in the slide-out state.

The electronic device 200 includes a front surface 200a (e.g., a first surface), a rear surface 200b (e.g., a second surface) facing in the opposite direction to the front surface 200a, and a side surface surrounding the space between the front surface 200a and the rear surface 200b. The electronic device 200 includes a first housing 210 including a first side surface member 211 and a second housing 220 including a second side surface member 221. The first side surface member 211 includes a first side surface 2111 having a first length along a first direction (x-axis direction), a second side surface 2112 extending from the first side surface 2111 to have a second length greater than the first length in a direction substantially perpendicular to the first side surface 2111, and a third side surface 2113 extending substantially parallel to the first side 2111 from the second side surface 2112 and having a first length. The first side surface member 211 may be at least partially formed of a conductive material (e.g., metal). At least a portion of the first side surface member 211 includes a first support member 212 extending to at least a portion of the inner space of the first housing 210 (e.g., the first space 2101 of FIG. 5).

The second side surface member 221 includes a fourth side surface 2211 at least partially corresponding to the first side surface 2111 and having a third length, a fifth side surface 2212 extending from the fourth side surface 2211 in a direction substantially parallel to the second side 2112 surface and having a fourth length greater than the third length, and a sixth side surface 2213 extending from the fifth side surface 2212 to correspond to the third side surface 2113 and having a third length. The second side surface member 221 may be at least partially formed of a conductive material (e.g., metal). At least a portion of the second side surface member 221 includes a second support member 222 that extends to at least a portion of the inner space of the second housing 220 (e.g., the second space 2201 of FIG. 5). The first side surface 2111 and the fourth side surface 2211 and the third side surface 2113 and the sixth side surface 2213 may be slidably coupled to each other. In the slide-in state, at least a portion of the first side surface 2111 overlaps with at least a portion of the fourth side surface 2211, so that the remaining portion of the first side 2111 surface may be visible to a user. In the slide-in state, at least a portion of the third side surface 2113 overlaps with at least a portion of the sixth side surface 2213, so that the remaining portion of the third side surface 2113 may be visible to a user.

In the slide-in state, at least a portion of the first support member 212 may overlap the second support member 222, and the remaining portion of the first support member 212 may be visible from the outside. Accordingly, the first support member 212 includes, in the slide-in state, a non-overlapping portion 212a that does not overlap the second support member 222, and an overlapping portion 212b that overlaps the second support member 222. The non-overlapping portion 212a and the overlapping portion 212b may be integrally formed or may be provided separately and may be structurally coupled.

In some embodiments, the first support member 212, in the slide-in state, may entirely overlap the second support member 222, so that it is not visible from the outside, and in the slide-out state, a part thereof may be visible from the outside.

The first housing 210 includes, in the first space 2101, the first sub-space A corresponding to the non-overlapping portion 212a and the second sub-space B corresponding to the overlapping portion 212b. The first sub-space A and the second sub-space B may be disposed at least partially connected to each other or in a separated manner. The first sub-space A may have a shape different from that of the second sub-space B, e.g., due to an overlapping structure in which the second support member 222 and the first support member 212 overlap in an area corresponding to the second sub-space B.

Figure 4:
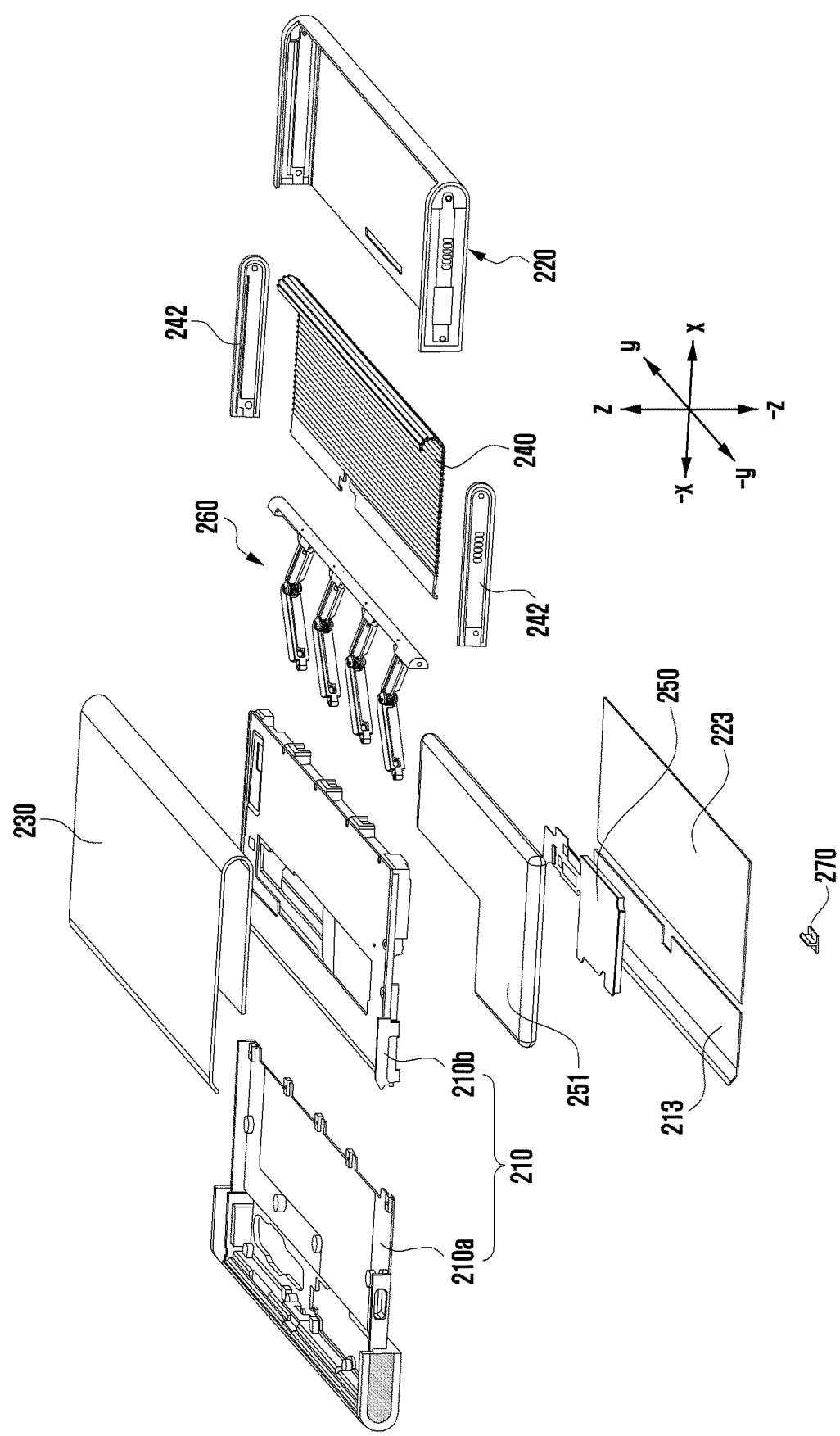
FIG. 4 illustrates an exploded perspective view of an electronic device according to an embodiment.
Figure 5:
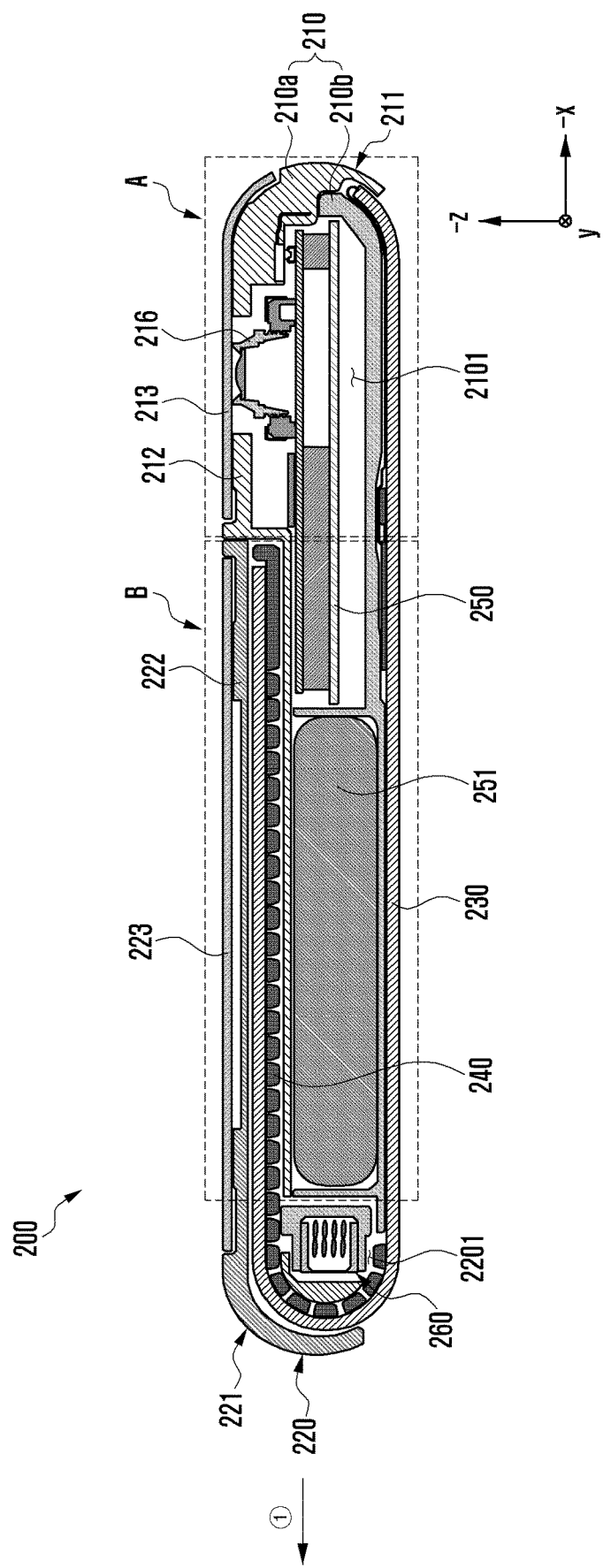
FIG. 5 illustrates a cross-sectional view of the electronic device of FIG. 3A taken along line 5-5, according to an embodiment.

The electronic device 200 includes a plurality of electronic components (e.g., a camera module 216, a sensor module 217, a flash 218, a main board (e.g., main board 250 in FIG. 4) and a battery (e.g., battery 251 in FIG. 4)) disposed in the first space of the first housing 210 (e.g., the first space 2101 of FIG. 5).

The first sub-space A may be utilized as an area in which a relatively large mounting space is required (that is, a relatively large mounting thickness is required) or an area in which electronic components (e.g., the camera module 216, the sensor module 217, or the flash 218) to be operated by avoiding the overlapping structure are disposed.

The second sub-space B) may be utilized as an area in which a relatively small mounting space is required (that is, a relatively small mounting thickness is required) or an area in which electronic components (e.g., the main board 250 (PCB) of FIG. 4 or a battery (e.g., the battery 251 of FIG. 4)) that can be operated regardless of the overlapping structure are disposed.

The front surface 200a and the rear surface 200b of the electronic device 200 may vary according to the slide-in state and the slide-out state. The electronic device 200, in the rear 200b, includes a first rear cover 213 disposed on at least a portion of the first housing 210 and a second rear cover 223 disposed on at least a portion of the second housing 220. The first rear cover 213 and the second rear cover 223 may be separately disposed on the first support member 212 and the second support member 213, or the first rear cover 213 and/or the second rear cover 223 may be integrally formed with the side members 211 and 221. The first rear cover 213 and the second rear cover 223 may be made of a polymer, coated or tinted glass, ceramic, or metal (e.g., aluminum, stainless steel (STS), or magnesium) or may be formed by a combination of at least two of the above materials. The first rear cover 213 and/or the second rear cover 223 may extend to at least a portion of the side members 211 and 221. At least a portion of the first support member 212 may be replaced with the first rear cover 213, and at least a portion of the second support member 222 may be replaced with the second rear cover 223.

The electronic device 200 includes a flexible display 230 disposed at least a portion of the first housing 210 and the second housing 220. The flexible display 230 includes a first portion 230a that is visible from the outside (e.g., a flat portion) and a second portion 230b (e.g., a bendable portion) extending from the first portion 230a and at least partially introduced into the inner space of the second housing 220 (e.g., the first space 2201 in FIG. 5) so as not to be visible in the slide-in state. The first portion 230a may be disposed to receive the support of the first housing 210 and the second portion 230b may be at least partially disposed to be supported by a bendable member (e.g., the bendable member 240 of FIG. 5). The flexible display 230, while the second housing 220 is supported by the bendable member (e.g., the bendable member 240 of FIG. 5) while the second housing 220 is slid-out along the designated first direction (x-axis direction), may extend from the first portion 230a, form a plane substantially the same as the first portion 230a, and may be visible from the outside. The second portion 230b of the flexible display 230, while the second housing 220 is retracted along the designated second direction (−x-axis direction), may be introduced into the inner space of the second housing 220 (e.g., the second space 2201 of FIG. 5) and may not be visible from the outside. Accordingly, in the electronic device 200, the display area of the flexible display 230 may vary as the second housing 220 slides along a designated direction from the first housing 210.

The first housing 210 and the second housing 220 may be operated in a sliding manner so that the overall width with respect to each other is variable. The electronic device 200 may be configured to have a first width W1 from the second side surface 2112 to the fourth side surface 2212 in the slide-in state. While the electronic device 200 is in the slide-out state, a portion of the bendable member (e.g., bendable member 240 of FIG. 5) introduced into the internal space (e.g., the second space 2201 of FIG. 5) of the second housing 210 is moved to have an additional second width W2, and may be configured to have a third width W3 larger than the first width W1. For example, the flexible display 230 may have a display area substantially corresponding to the first width W1 in the slide-in state, and may have an extended display area substantially corresponding to the third width W3 in the slide-out state.

The slide-out operation of the electronic device 200 may be performed through a user's manipulation. For example, the second housing 220 may be slid-out in a designated first direction (e.g., the x-axis direction) through manipulation of a locker 270 exposed through the rear surface 200b of the electronic device. The locker 270 is disposed in the first housing 210 and locks the second housing 220 to the first housing 210 in the slide-in state until pressed by the user.

The electronic device 200, in the slide-in state, may be transitioned to the slide-out state through a user's manipulation of pressing the outer surface of the flexible display 230 in a designated first direction (x-axis direction). The second housing 220 may also be operated automatically via a deployed drive mechanism (e.g., a drive motor, a reduction module, or a gear assembly) disposed at either or both the internal space of the first housing 210 (e.g., the first space 2101 of FIG. 5) or the internal space of the second housing 220 (e.g., the second space 2201 of FIG. 5). When the electronic device 200 detects an event for transition of the slide-in/slide-out state of the electronic device 200 through a processor (e.g., the processor 120 of FIG. 1), the electronic device 200 may be set to control the operation of the second housing 220 using a driving mechanism. The processor of the electronic device 200 (e.g., the processor 120 of FIG. 1), depending on a slide-in state, slide-out state, or intermediate state (e.g., free stop state) and in response to the changed display area of the flexible display 230, may control the flexible display 230 to display an object in various ways and execute an application program.

The electronic device 200 includes an input device 203, sound output devices 206 and 207, sensor modules 204 and 217, camera modules 205 and 216, a connector port 208, a keystroke device, or an indicator, which are disposed in the first space of the first housing 210 (e.g., the first space 2101 of FIG. 5). Alternatively, the electronic device 200 may be configured such that at least one of the above-described components is omitted or other components are additionally included.

The input device 203 may include a microphone. The input device 203 may include a plurality of microphones arranged to sense the direction of sound. The sound output devices 206 and 207 may include speakers. For example, the sound output devices 206 and 207 may include a receiver 206 for a call and an external speaker 207.

The external speaker 207 may face the outside through the first speaker hole 207a disposed in the first housing 210 in the slide-out state. The external speaker 207, in the slide-in state, may be connected to the outside through the first speaker hole 207a and the second speaker hole 207b formed in the second housing 220 to correspond to the first speaker hole 207a. The connector port 208 may face the outside through the connector port hole 208a formed in the first housing 210 in the slide-out state. The connector port 208 may be hidden from view through the second housing 220 in the slide-in state. The connector port 208 may face the outside through another connector port hole formed in the second housing 220 to correspond to the connector port hole 208a even in the slide-in state. The sound output device 206 may include a speaker (e.g., a piezo speaker) that operates while excluding a separate speaker hole.

The sensor modules 204 and 217 may generate an electrical signal or data value corresponding to an internal operating state of the electronic device 200 or an external environmental state. The sensor modules 204 and 217 may include a first sensor module 204 (e.g., a proximity sensor or an illuminance sensor) disposed on the front surface 200a of the electronic device 200 and a second sensor module 217 (e.g., a heart rate monitoring (HRM) sensor) disposed on the rear surface 200b. The first sensor module 204 may be disposed below the flexible display 230 on the front surface 200a of the electronic device 200. The first sensor module 204 and the second sensor module 217 may include at least one of a proximity sensor, a light sensor, a time of flight (TOF) sensor, an ultrasonic sensor, a fingerprint sensor, a gesture sensor, a gyro sensor, a barometric pressure sensor, a magnetic sensor, an accelerometer, a grip sensor, a color sensor, an IR sensor, a biometric sensor, a temperature sensor, or a humidity sensor.

The camera modules 205 and 216 may include a first camera module 205 disposed on the front surface 200a of the electronic device 200 and a second camera module 216 disposed on the rear surface 200b of the electronic device 200. The electronic device 200 may include a flash 218 positioned near the second camera module 216. The camera modules 205, 216 may include one or more lenses, an image sensor, and an ISP. The first camera module 205 may be disposed under the flexible display 230 and may be configured to photograph a subject through a portion of an active area of the flexible display 230. The flash 218 may include a light emitting diode (LED) or a xenon lamp.

The first camera module 205 of the camera modules 205 and 216 and some sensor modules 204 of the sensor modules 204 and 217 may be arranged to detect the external environment through the flexible display 230. For example, the first camera module 205 or some sensor modules 204 may be disposed in the internal space of the electronic device 200 to be in contact with the external environment through an opening or a transparent area perforated in the flexible display 230. The area facing the first camera module 205 of the flexible display 230 may be formed as a transparent area having a designated transmittance as a part of an area displaying content. The transmissive region may have a transmittance ranging from about 5% to about 20%. Such a transmissive region may include a region overlapping an effective region (e.g., an angle of view region) of the first camera module 205 through which light for generating an image by being imaged by an image sensor passes. For example, the transparent area of the flexible display 230 may include an area having a lower pixel density or wiring density or both than the surrounding area. For example, the transmissive area may replace the aforementioned opening. Some camera modules 205 may include an under display camera (UDC). Some sensor modules 204 may be arranged to perform their functions without being visually exposed through the flexible display 230 in the internal space of the electronic device 200.

The electronic device 200 includes at least one conductive portion as an antenna A1 (e.g., an antenna structure or an antenna radiator) electrically connected to a wireless communication circuit (e.g., the wireless communication module 192 in FIG. 1) disposed in the first space 2101 of the first housing 210. The at least one conductive portion may include a first conductive portion 310 disposed through at least a portion of the first side surface 2111 of the first housing 210. A non-conductive portion 314 may be disposed on the first conductive portion 310. The first conductive portion 310 may be spaced apart from the surrounding conductive material by a non-conductive portion 315 disposed on the fourth side surface 2211 of the second housing 220 in the slide-in state.

The first conductive portion 310, in the first side surface 2111, includes a first portion 311 formed with a specified width to have a length along the first direction (x-axis direction), a second portion 312 spaced apart from the first portion 311 at a specified interval and formed with a specified width to have a length along the first direction (x-axis direction), and a third portion 313 connecting one end of the first portion 311 and one end of the second portion 312. The first portion 311, the second portion 312, and the third portion 313 may be integrally formed. The length of the first portion 311 and the second portion 312 may be substantially the same or may be different from each other. The third portion 313 may be disposed at a position adjacent to the second side surface 2112. The first conductive portion 310, in the first side surface 3111, while in the slide-in state, is not covered by the fourth side surface 2211 of the second housing 220, but is disposed in an area exposed to the outside, may help to develop stable radiation performance of the antenna regardless of a sliding operation. The first conductive portion 310 may be formed in a "U" shape or in a "C" shape.

The electronic device 200, in substantially the same manner as the antenna A1 using the first conductive portion 310 disposed on the first side surface 2111 of the first housing 210, in the third side surface, may further include another antenna A3 with another conductive portion 340 disposed through non-conductive portions 344 and 345.

The electronic device 200, in a position not involved in the sliding motion, as spaced apart from the conductive structure of the flexible display 230 (e.g., the conductive plate 2304 of FIG. 6D) and formed in a shape having a sufficient electrical length, may help to develop smooth radiation performance in the specified frequency band (e.g., a low band) of the antenna.

FIG. 4 illustrates an exploded perspective view of an electronic device according to an embodiment.

Referring to FIG. 4, the electronic device includes a first housing 210 including a first space (e.g., the first space 2101 of FIG. 5), a second housing 220, which is slidably coupled to the first housing 210 and includes a second space (e.g., the second space 2201 in FIG. 5), a bendable member 240 that is at least partially rotatably disposed in the second space (e.g., the second space 2201 of FIG. 5), and a flexible display 230 disposed at at least a portion of the bendable member 240 and the first housing 210. The first space of the first housing 210 (e.g., the first space 2201 in FIG. 5) may be provided through the combination of the first bracket housing 210a and the second bracket housing 210b. At least a portion of the first bracket housing 210a may include a first support member (e.g., the first support member 212 of FIG. 3B) or may be replaced with the first support member 212. The electronic device 200 includes a main board 250 disposed in the first space (e.g., the first space 2201 of FIG. 5). The electronic device may include a camera module (e.g., the camera module 216 of FIG. 3A) or a sensor module (e.g., the sensor module 217 of FIG. 3A) disposed in the first space (e.g., the first space 2101 of FIG. 5).

The bendable member 240 may be disposed as one end is fixed to the first housing 210 and the other end is at least partially rotatably accommodated in the second space (e.g., the second space 2201 of FIG. 5) of the second housing 220. For example, the bendable member 240, in the slide-in state, may be at least partially accommodated in the second space (e.g., the second space 2201 in FIG. 5); and. In the slide-out state, the bendable member 240 may be at least partially slid-out from the second space (e.g., the second space 2201 of FIG. 5) to form substantially the same plane as the first housing 210. Accordingly, the first housing 210 or the flexible display 230 may have a variable display area according to a sliding operation.

The electronic device 200 includes a guide rail 242 disposed on side surfaces of the combined first bracket housing 210a and the second bracket housing 210b in the inner space of the second housing 220 (e.g., the second space 2201 of FIG. 5). The electronic device 200 may further include a cover member that cover both sides of the second support member (e.g., the second support member 222 of FIG. 3B) of the second housing 220.

The electronic device includes a support assembly 260 that is disposed from the first housing 210 toward the second space (e.g., the second space 2201 of FIG. 5) and presses the second housing 220 in a direction to be drawn out. The support assembly 260 may reduce a sagging phenomenon of the flexible display 230 by supporting the bendable member 240 during operation. The support assembly 260, in a manner that is fixed to the first housing 210 and presses the rear surface of the bendable member 240, may guide the second housing 220 in a direction to be slid-out. The electronic device 200 includes a locker 270 for maintaining the electronic device in the slide-in state. The locker 270 is movably disposed in the first housing 210 and, in the slide-in state, stops the movement of the second housing 220 in the slide-out direction.

FIG. 5 illustrates a cross-sectional view of the electronic device of FIG. 3A, taken along line 5-5, according to an embodiment.

Referring to FIG. 5, the electronic device 200 includes a first housing 210 having a first space 2101, a second housing 220 having a second space 2201, a bendable member 240 connected to the first housing and at least partially accommodated in the second space 2201 in the slide-in state, a flexible display 230 that is supported by at least a portion of the bendable member 240 and at least a portion of the first housing 210, and a support assembly 260, which is disposed in the first housing 210 and presses the second housing 220 in the direction in which it is slid-out (direction ①). The electronic device 200 may include a plurality of electronic components. The plurality of electronic components may be disposed in the first space 2101 of the first housing 210. The first space 2101 includes a first sub-space A having a first spatial volume and a second sub-space B connected to the first sub-space A and having a different shape than the first sub-space A. The second sub-space B may include a space corresponding to a region in which a part of the first housing 210 overlaps a part of the second housing 220 when the electronic device 200 is in the slide-in state.

Among the plurality of electronic components, first electronic components that require a relatively large mounting space may be disposed in the first sub-space A, and as such, a relatively large mounting thickness of the electronic device 200 may be required or an overlapping structure of the two housings 210 and 220 is avoided. The first electronic components may include a camera module 216, a sensor module (e.g., the sensor module 217 of FIG. 3B), and/or a flash (e.g., the flash 218 of FIG. 3B). At least some of the first electronic components may be disposed to face the external environment through the first support member 212 and/or the first rear cover 213.

Second electronic components, among the plurality of electronic components, which require a relatively small mounting space may be disposed in the second sub-space B, and as such, a relatively small mounting thickness of the electronic device 200 may be utilized or the operation may be performed regardless of the overlapping structure of the two housings 210 and 220. The second electronic components may include a main board 250 and/or a battery 251. When the first sub-space A and the second sub-space B are connected to some electronic components (e.g., the main board 250 or an FPCB) among the plurality of electronic components, the two sub-spaces may be placed together.

Figure 6A:
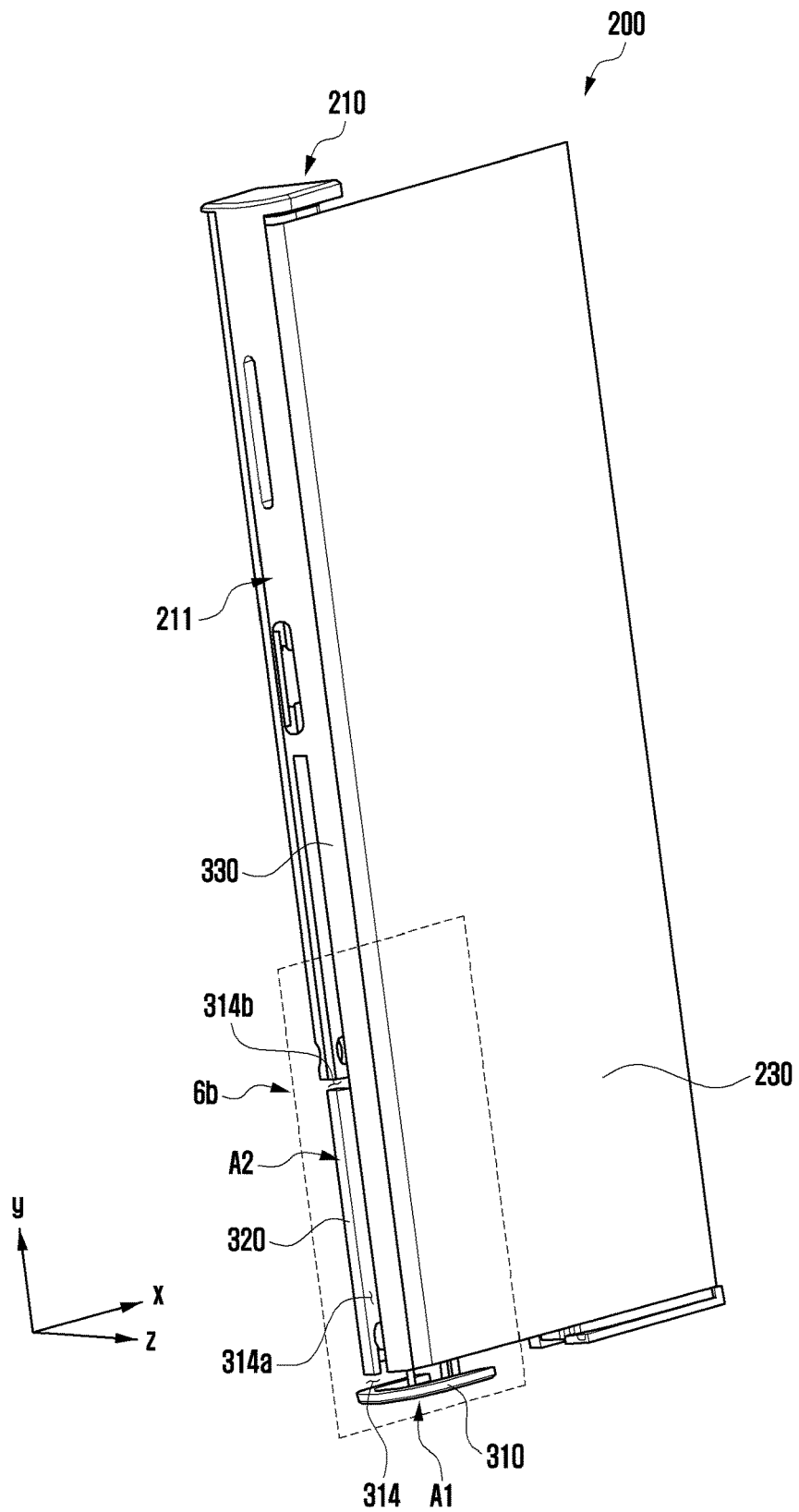
FIG. 6A illustrates an electronic device including a first housing and a flexible display supported thereon according to an embodiment.
Figure 6B:
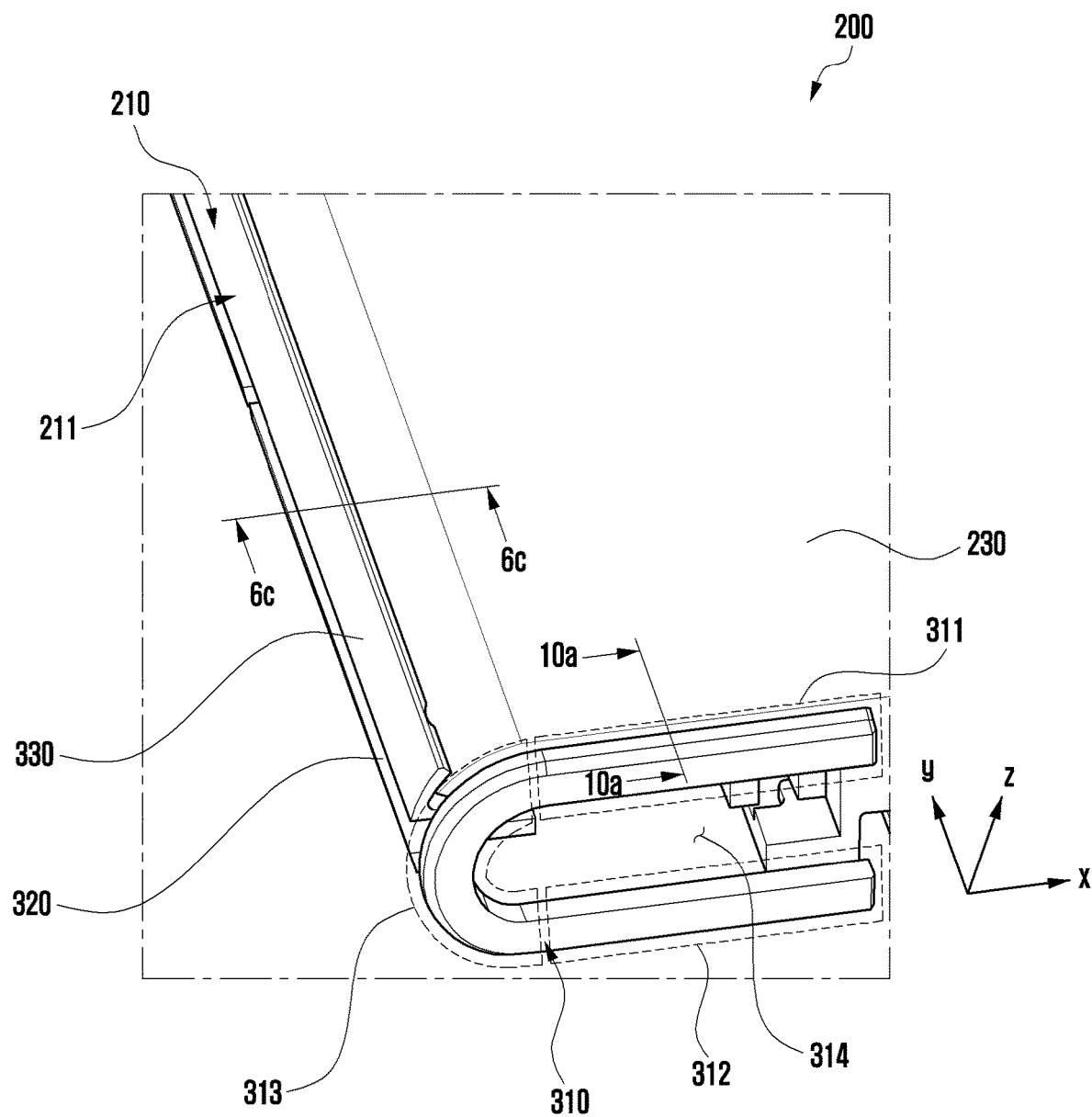
FIG. 6B illustrates an enlarged view of area 6b of FIG. 6A according to an embodiment.
Figure 6C:
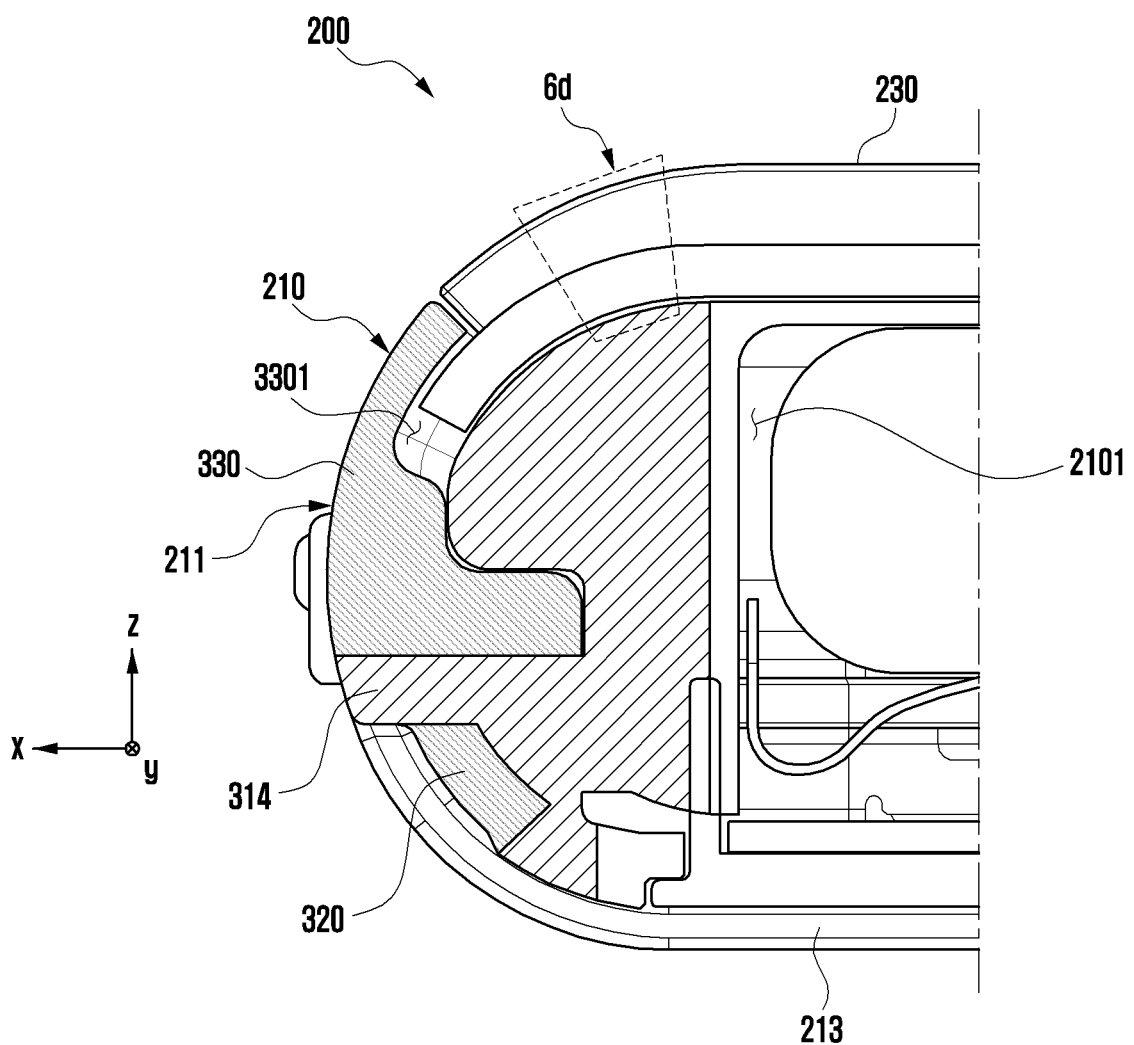
FIG. 6C illustrates a partial cross-sectional view of the electronic device of FIG. 6B, taken along line 6c-6c, according to an embodiment.
Figure 6D:
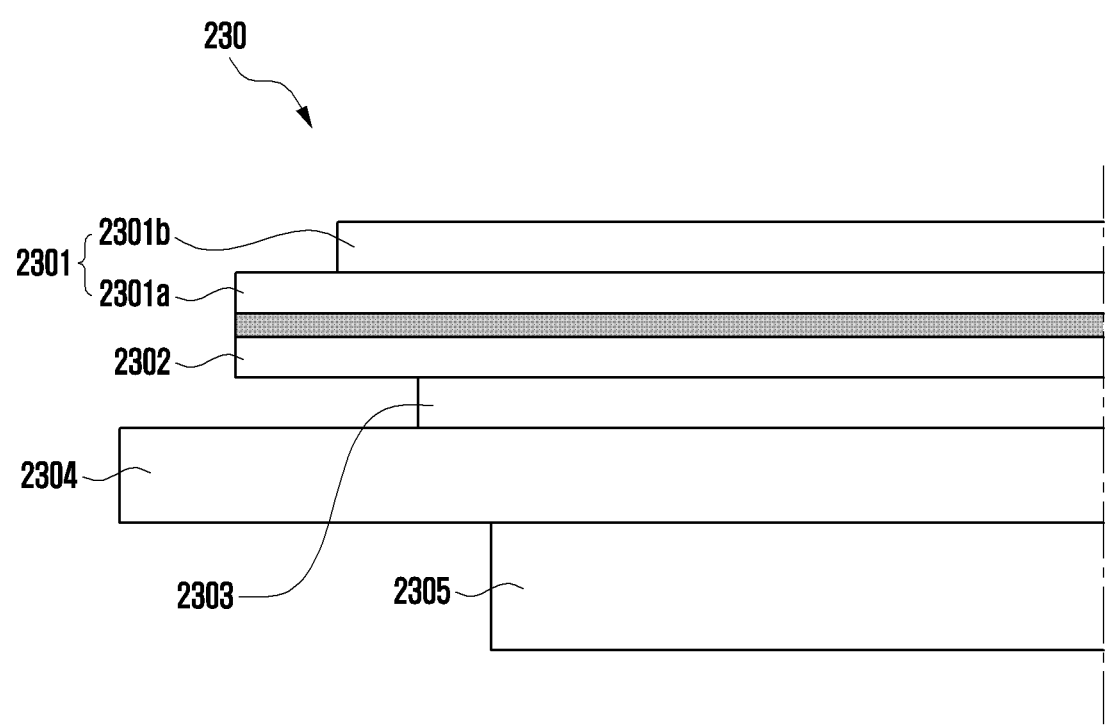
FIG. 6D illustrates a cross-sectional structure of a region 6d of the flexible display of FIG. 6C according to an embodiment.

FIG. 6A illustrates an electronic device including a first housing and a flexible display supported thereon according to an embodiment. FIG. 6B illustrates an enlarged view of area 6b of FIG. 6A according to an embodiment. FIG. 6C illustrates a partial cross-sectional view of the electronic device of FIG. 6B, taken along line 6c-6c, according to an embodiment. FIG. 6D illustrates a cross-sectional structure of a region 6d of the flexible display of FIG. 6C according to an embodiment.

Referring to FIGS. 6A to 6D, the electronic device 200 includes a first housing 210, a second housing slidably coupled to the first housing 210 (e.g., the second housing 220 of FIG. 2A), and a flexible display 230 that is supported by at least a portion of the first housing 210 and the second housing 220. The first housing 210 includes a first side surface member 211 that supports at least a portion of the flexible display 230. The first housing 210 includes a first conductive portion 310 disposed on the first side of the first side surface member 211 (e.g., the first side surface 2111 of FIG. 2A), and a second conductive portion 320, which is disposed on the second side (e.g., the second side surface 2112 of FIG. 2A) and is electrically disconnected from the first conductive portion 310. On the second side surface 2112, the first housing 210 includes a third conductive portion 330 that is electrically isolated from the first conductive portion 310 and the second conductive portion 320. The third conductive portion 330 supports at least a portion of the flexible display 230. The first conductive portion 310 may be segmented from the third conductive portion 330 through the non-conductive portion 314. The second conductive portion 320 may be segmented from the third conductive portion 330 through additional non-conductive portions 314a and 314b (e.g., an injection molding product). The non-conductive portion 314 and the additional non-conductive portions 314a and 314b may be integrally formed or formed separately from each other. The second conductive portion 320 and/or the third conductive portion 330 may at least partially form the appearance of the electronic device 200.

At least a portion of the second conductive portion 320 or the third conductive portion 330 may be hidden from view by at least a portion of the first rear cover 213. The non-conductive portion 314 may be disposed in such a way that it is injected into the space between the conductive portions 310, 320, and 330. At least a portion of the non-conductive portion 314 may form the exterior of the electronic device 200. The first conductive portion 310 and/or the second conductive portion 320, by being connected with a wireless communication circuit (e.g., the wireless communication circuit 259 of FIG. 7) (e.g., the wireless communication module 192 of FIG. 1), may be used as an antenna.

The third conductive portion 330 includes a support structure 3301 (e.g., a seating groove) for supporting one end of the flexible display 230. The support structure 3301 may be formed through coupling of the third conductive portion 330 and the non-conductive portion 314. The flex-ible display 230 may be disposed such that an edge portion is supported by the support structure 3301 of the third conductive portion 330.

The flexible display 230 includes a protective layer 2301, a display panel 2302 sequentially disposed under protective layer 2301, a polymer layer 2303, a conductive plate 2304 (e.g., a metal sheet layer), and an auxiliary material layer 2305. The protective layer 2301 includes a window layer 2301a (e.g., ultra-thin glass (UTG)) and a protective film 2301b (e.g., polyethylene terephthalate (PET) or polyimide (PI)) laminated on the window layer 2301. The polymer layer 2303 may include a buffer layer. The polymer layer 2303 may be disposed under the conductive plate 2304. The conductive plate 2304 may reinforce the rigidity of the electronic device 200, shield ambient noise, dissipate heat emitted from surrounding heat dissipating components, and/or may be used to provide flexibility to the flexible display 230. The auxiliary material layer 2305 may include a graphite sheet for heat dissipation or an elastic member for cushioning.

The second conductive portion 320 may be disposed to be segmented from the third conductive portion 330 through the non-conductive portion 314. For example, when the second conductive portion 320 is integrally formed with the third conductive portion 330 or is disposed to be in contact with the third conductive portion 330, radiation performance degradation of the antenna may occur due to the proximity arrangement of the conductive plate 2304 of the flexible display 230 supported by the third conductive portion 330.

FIGS. 7A to 7D illustrate an electrical connection structure of a first conductive portion and a second conductive portion used as an antenna according to an embodiment.

Figure 7A:
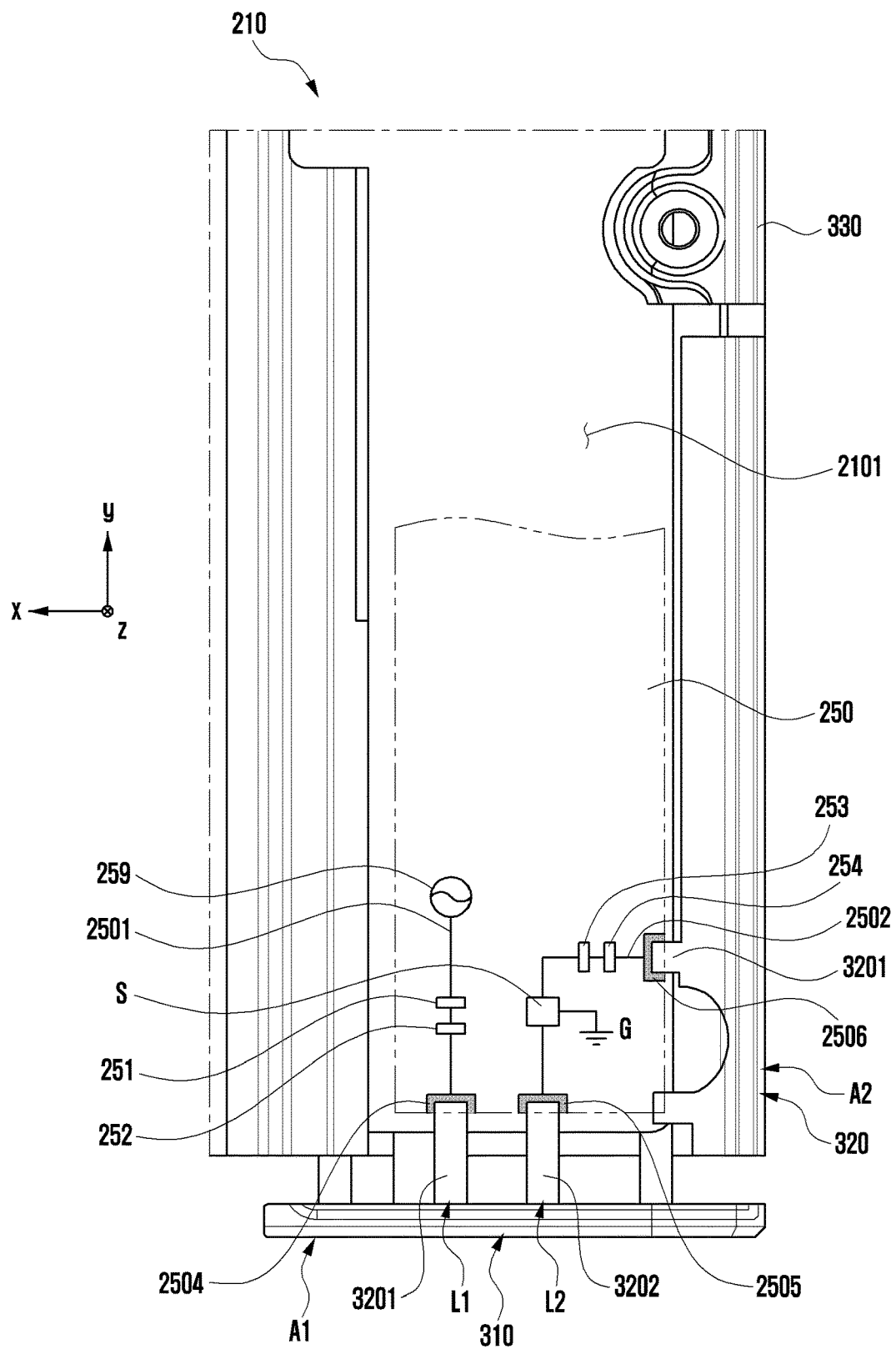
FIGS. 7A to 7D illustrate an electrical connection structure of a first conductive portion and a second conductive portion used as an antenna according to an embodiment.

Referring to FIG. 7A, the electronic device includes a wireless communication circuit 259 disposed in the first space 2101 of the first housing 210 (e.g., the wireless communication module 192 of FIG. 1). The wireless communication circuit 259 is disposed on the board 250 disposed in the first space 2101. The board 250 includes a first electrical path 2501 electrically connecting the wireless communication circuit 259 and the first conductive portion 310 and a second electrical path 2502 electrically connecting the second conductive portion 320 to the first conductive portion 310. A first electrical path 2501 is connected to a first designated location L1 of the first conductive portion 310, and a second electrical path 2502 is connected to a second location L2, which is different from the first location L1 of the first conductive portion 310. The second electrical path 2502 is disposed on the board 250 and may include a switching circuit S connected to the ground G of the board 250. The switching circuit S may be controlled by a processor (e.g., the processor 120 of FIG. 1) based on state information of the electronic device. The board 250 includes a first matching circuit 251 and a first electric shock prevention circuit 252 disposed in the first electrical path 2501. The board 250 includes a second matching circuit 253 disposed in a second electrical path 2502 electrically connecting the switching circuit S and the second conductive portion 320, and a second electric shock prevention circuit 254. The first matching circuit 251 and the second matching circuit 253 may include at least one passive element having a specified element value, such as a capacitor and an inductor. The first electric shock prevention circuit 252 and the second electric shock prevention circuit 254 may include at least one capacitor having a specified capacitance value.

The first electrical path 2501 is electrically connected to the first conductive pad 2504 disposed on the board 250. One end of the second electrical path 2502 is electrically connected to the second conductive pad 2505 disposed on the board 250, and the other end is electrically connected to the third conductive pad 2506 disposed on the board 250. The first conductive portion 310, at the first position L1, may extend from the first conductive portion 310, or through the coupled first connection piece 3101 may be linked with the first electrical path 2501. The first conductive portion 310, at the second position L2, may extend from the first conductive portion 310 or through a coupled second connection piece 3102 may be connected with one end of the second electrical path 2502. The second conductive portion 320 may be connected to the other end of the second electrical path 2502 through the third connection piece 3201 that extends or is coupled from the second conductive portion 320.

Figure 10A:
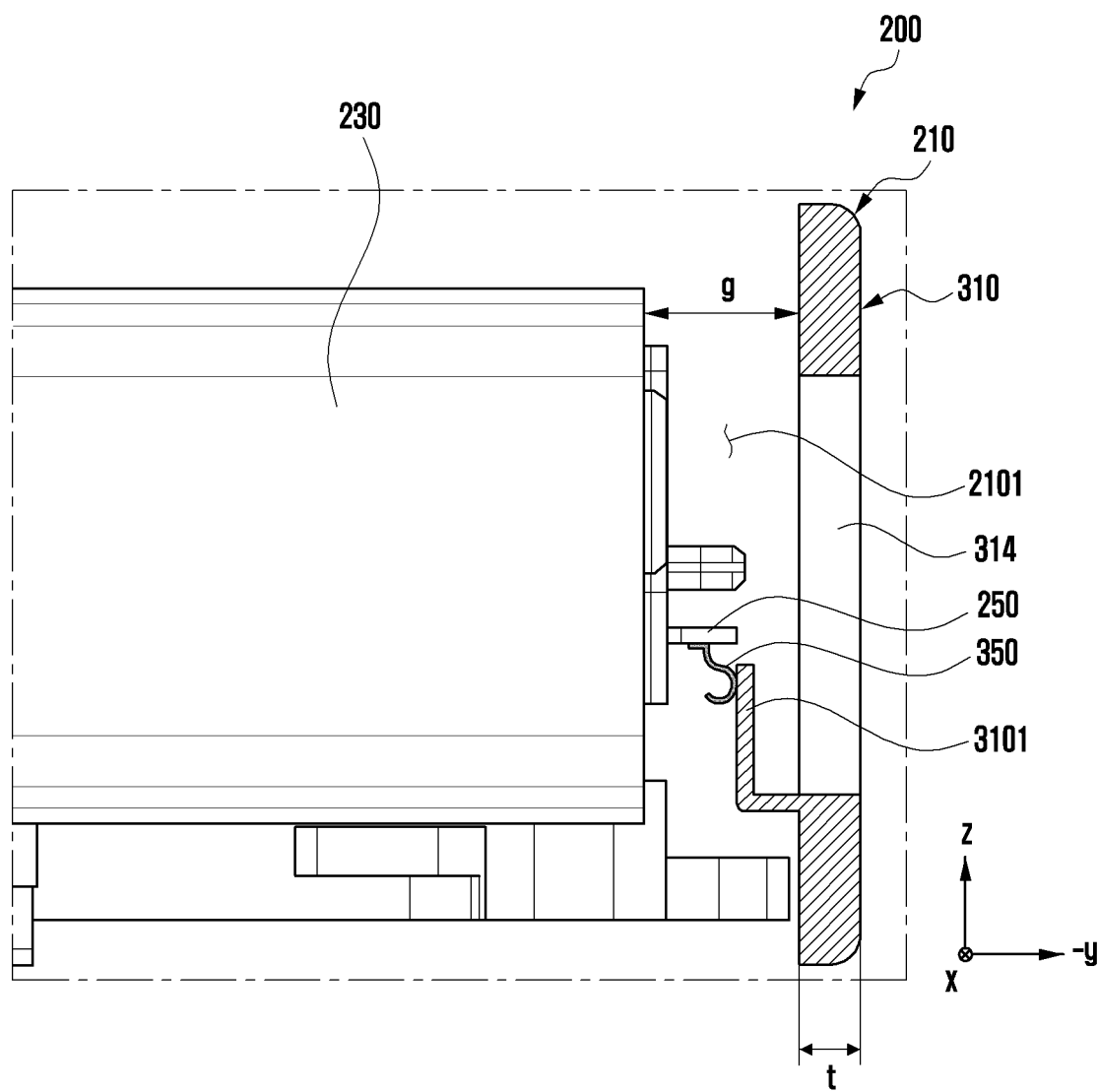
FIG. 10A illustrates the electronic device of FIG. 6B, taken along line 10a-10a, according to an embodiment.

The first conductive pad 2504, the second conductive pad 2505, and the third conductive pad 2506 may be electrically connected through the corresponding first connection piece 3101, the second connection piece 3102, the third connection piece 3201, and an electrical connection member such as a conductive contact spring, a C-clip, or conductive tape (e.g., electrical connection member 350 in FIG. 10A). The first conductive pad 2504, second conductive pad 2505, and third conductive pad 2506 may be physically and electrically connected to the first conductive portion 310 and the second conductive portion 320 directly through an electrical connection member (e.g., the electrical connection member 350 of FIG. 10A).

The wireless communication circuit 259 may be configured to transmit or receive a wireless signal in a designated frequency band via the first conductive portion 310 operating as the antenna A1. The antenna A1 may be set to change the operating frequency band through the switching operation of the switching circuit S. The second conductive portion 320 may operate as a dummy pattern or an additional extension pattern of the first conductive portion 310 operating as the antenna A1. For example, antenna A1, when the first conductive portion 310 is disconnected from the second conductive portion 320 through the switching circuit S, may be set to operate in the first frequency band. When the first conductive portion 310 is electrically connected to the second conductive portion 320 through the switching circuit S, antenna A1 may be set to operate in a second frequency band that is different from the first frequency band. For example, the second frequency band may be set lower than the first frequency band.

The wireless communication circuitry 259 may be set to transmit and receive a wireless signal in a low band, a mid band, a high band, or an ultra-high band via the first conductive portion 310 and the second conductive portion 320. The switching circuit S may be replaced with a variable circuit (e.g., a tunable integrated circuit (IC)) including a plurality of lumped elements. In this case, the first matching circuit 251 and the second matching circuit 253 may be omitted.

As another example, the first electric shock prevention circuit 252 or the second electric shock prevention circuit 254 may be omitted. For example, when the second conductive portion 320 is replaced with a laser direct structuring (LDS) pattern, the second electric shock prevention circuit 254 may be omitted.

The electronic device may include at least one processor (e.g., the processor 120 of FIG. 1) for detecting state information of the electronic device and functionally controlling the switching circuit S based on the detected state information. The at least one processor (e.g., processor 120 of FIG. 1) may control switching circuit S based on a grip of the user (e.g., grip information detected by a sensor) of the electronic device, in order to operate the antenna A1 in an optimal frequency band. The at least one processor, (e.g., processor 120 of FIG. 1) based on a region's operating frequency band or the strength of the received field strength, may control the switching circuit S to connect the first conductive portion 310 to the second conductive portion 320.

Alternatively, the second conductive portion 320 may be replaced with at least one conductive pattern disposed in the first space 2101 of the first housing 210. The conductive pattern may include an LDS pattern formed on a dielectric structure (e.g., an antenna carrier) disposed in the first space 2101. In order to reinforce the rigidity of the electronic device, the second conductive part 320 and the third conductive part 330 may be integrally formed.

In of the description of FIGS. 7B to 7D below, the same reference numerals are assigned to components substantially the same as those described above with reference to FIG. 7A, and detailed descriptions thereof may be omitted.

Figure 7B:
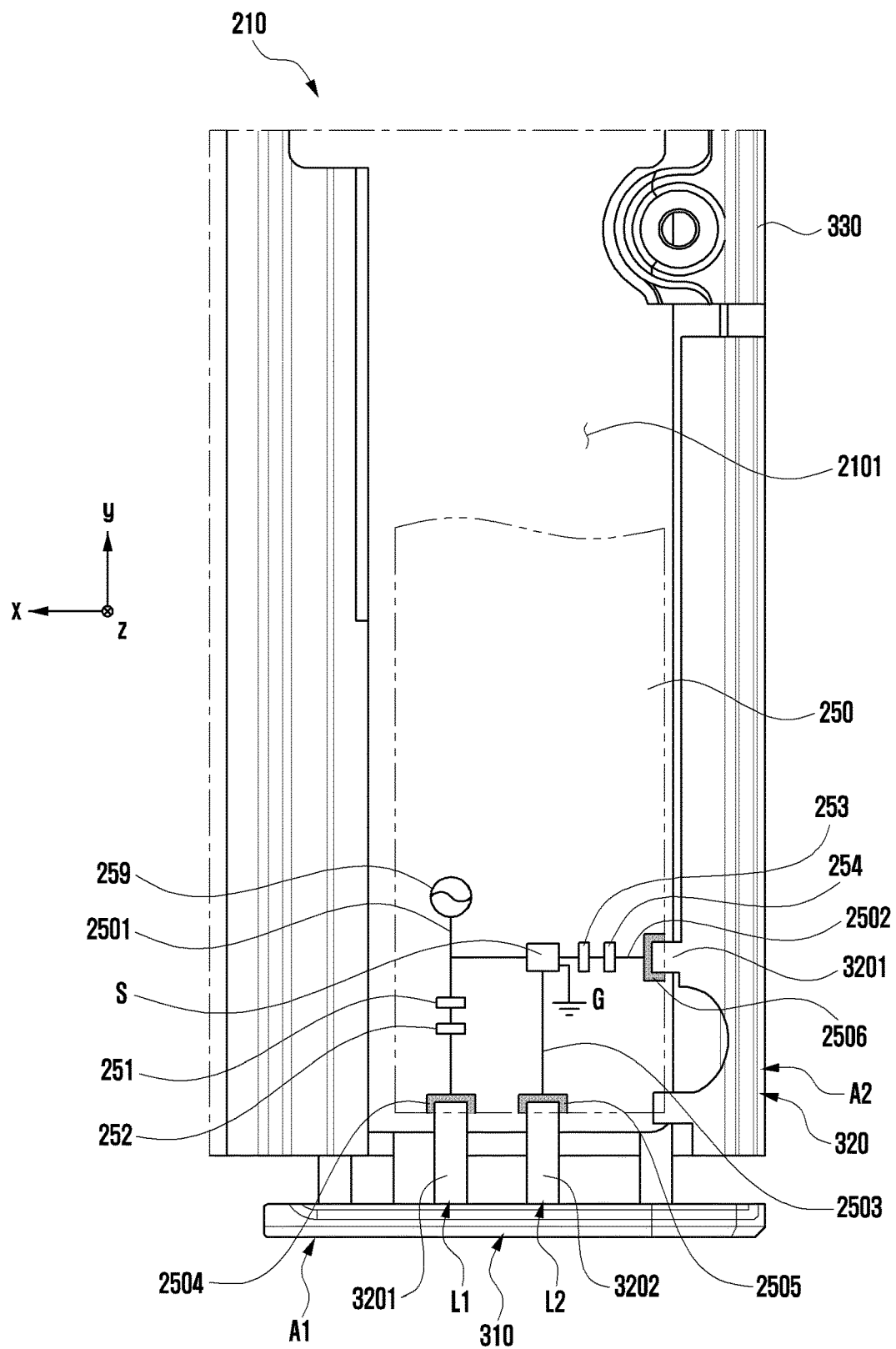

Referring to FIG. 7B, the board 250 further includes a third electrical path 2503 connecting the switching circuit S and the first conductive portion 310. In this case, only the first antenna A1 including the first conductive portion 310 operates, or the second antenna A2 including the second conductive portion 320 operates selectively through the switching operation of the switching circuit S. When only the first antenna A1 operates, the switch S may electrically connect the first electrical path 2501 to the ground through at least a portion of the second electrical path 2502. Alternatively, when only the first antenna A1 operates, the switch S may electrically connect the third electrical path 2503 to the ground. The operating frequencies of the first antenna A1 or the second antenna A2 may be the same or different.

Figure 7C:
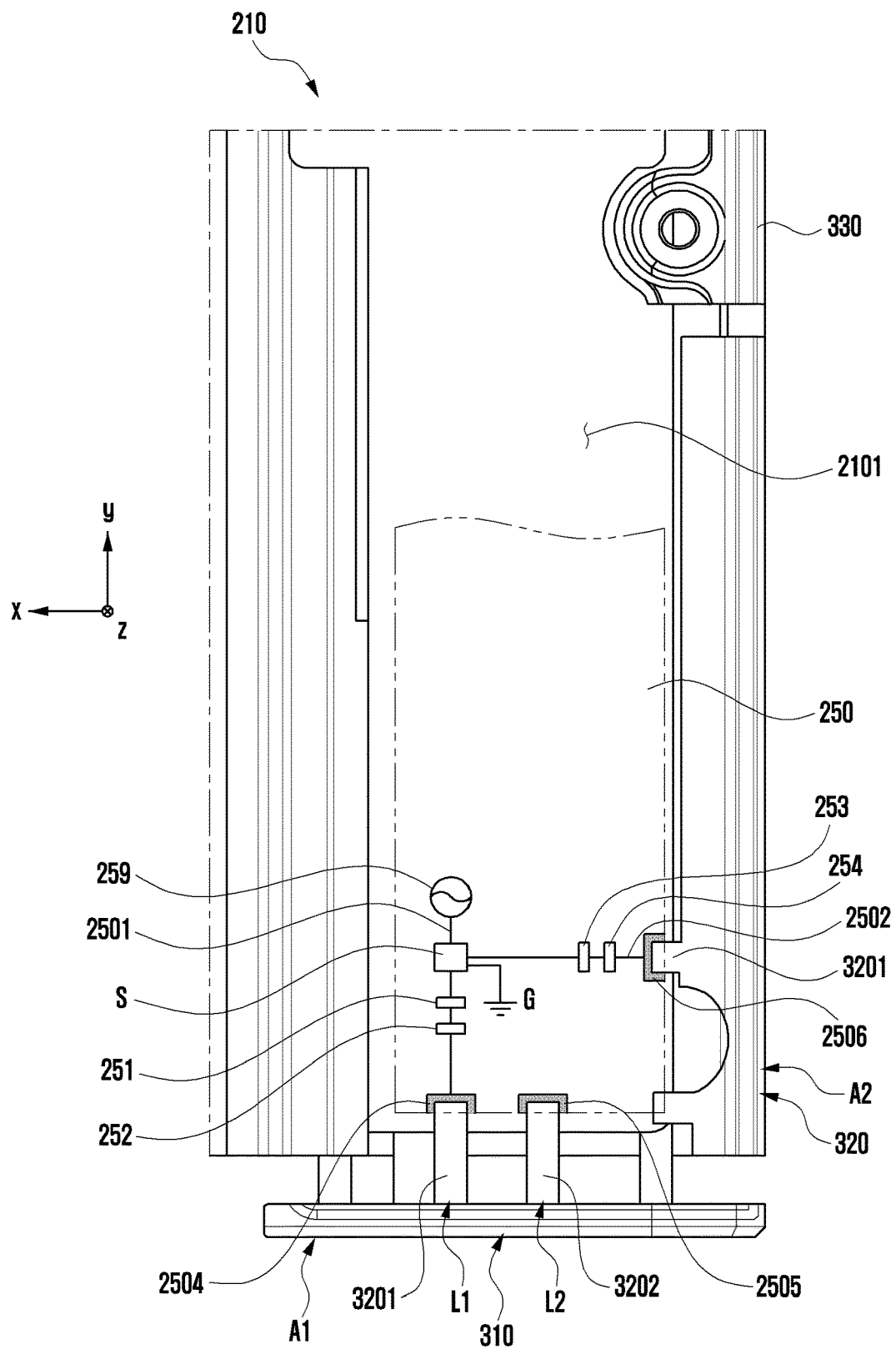

Referring to FIG. 7C, the board 250 includes a switching circuit S disposed in the first electrical path 2501 and electrically connected to the second electrical path 2502. Through the switching operation of the switching circuit S, the first antenna A1 through the first conductive portion 310 and the second antenna A2 through the second conductive portion 320 may be set to operate selectively or to operate together.

Figure 7D:
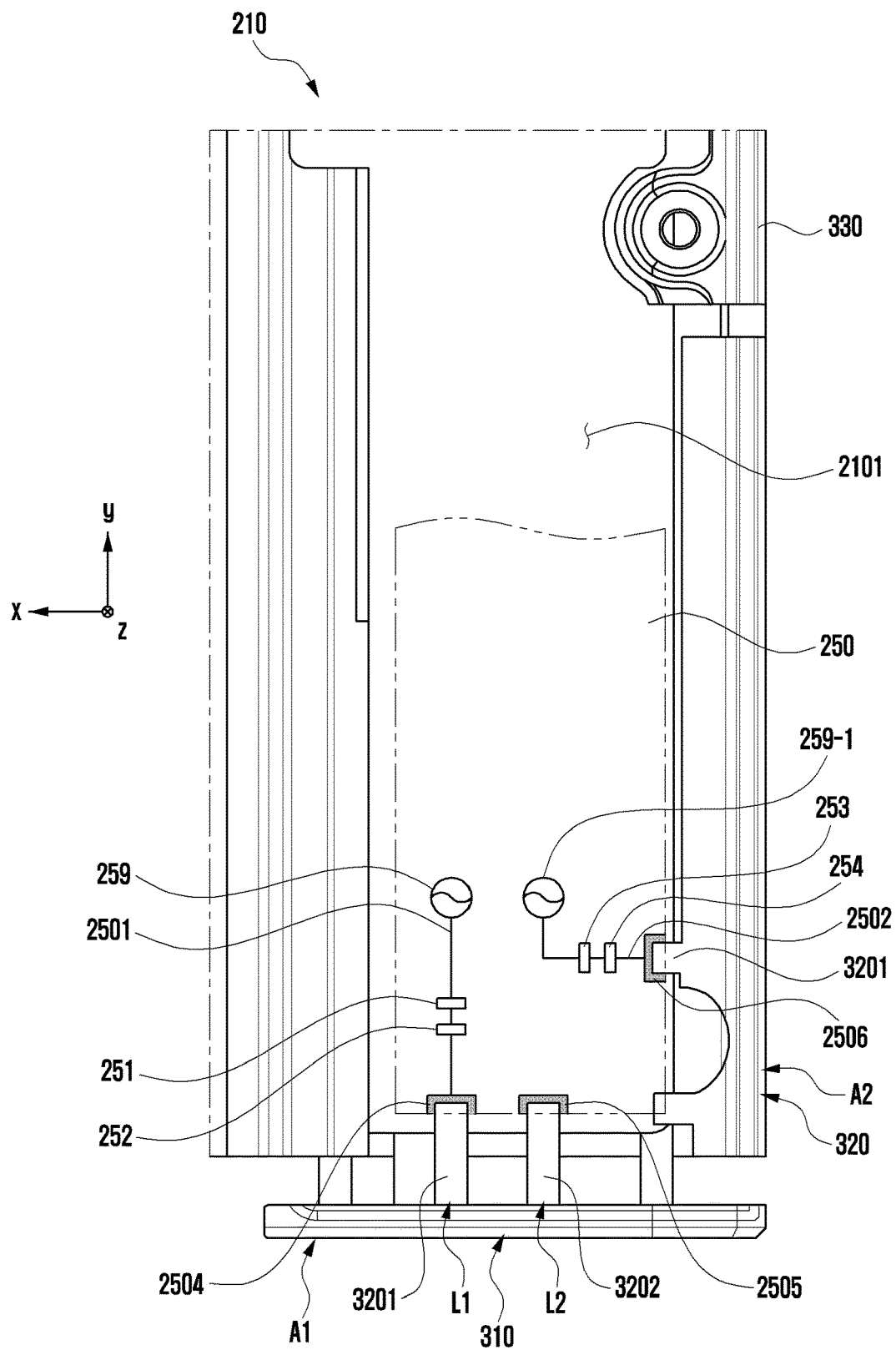

Referring to FIG. 7D, the board 250 includes a first wireless communication circuit 259 electrically connected to the first conductive portion 310 through a first electrical path 2501 and a second wireless communication circuit 259-1 electrically connected to the second conductive portion 320 through a second electrical path 2502. The first wireless communication circuit 259 may be set to operate in the first frequency band through the first antenna A1 using the first conductive portion 310. The second wireless communication circuit 259-1 may be set to operate in the second frequency band through the second antenna A2 using the second conductive portion 320. The processor (e.g., the wireless communication module 192 of FIG. 1) may control the first wireless communication circuit 259 or the second wireless communication circuit 259-1 so that the first antenna A1 and the second antenna A2 selectively operate or operate together.

Figure 8A:
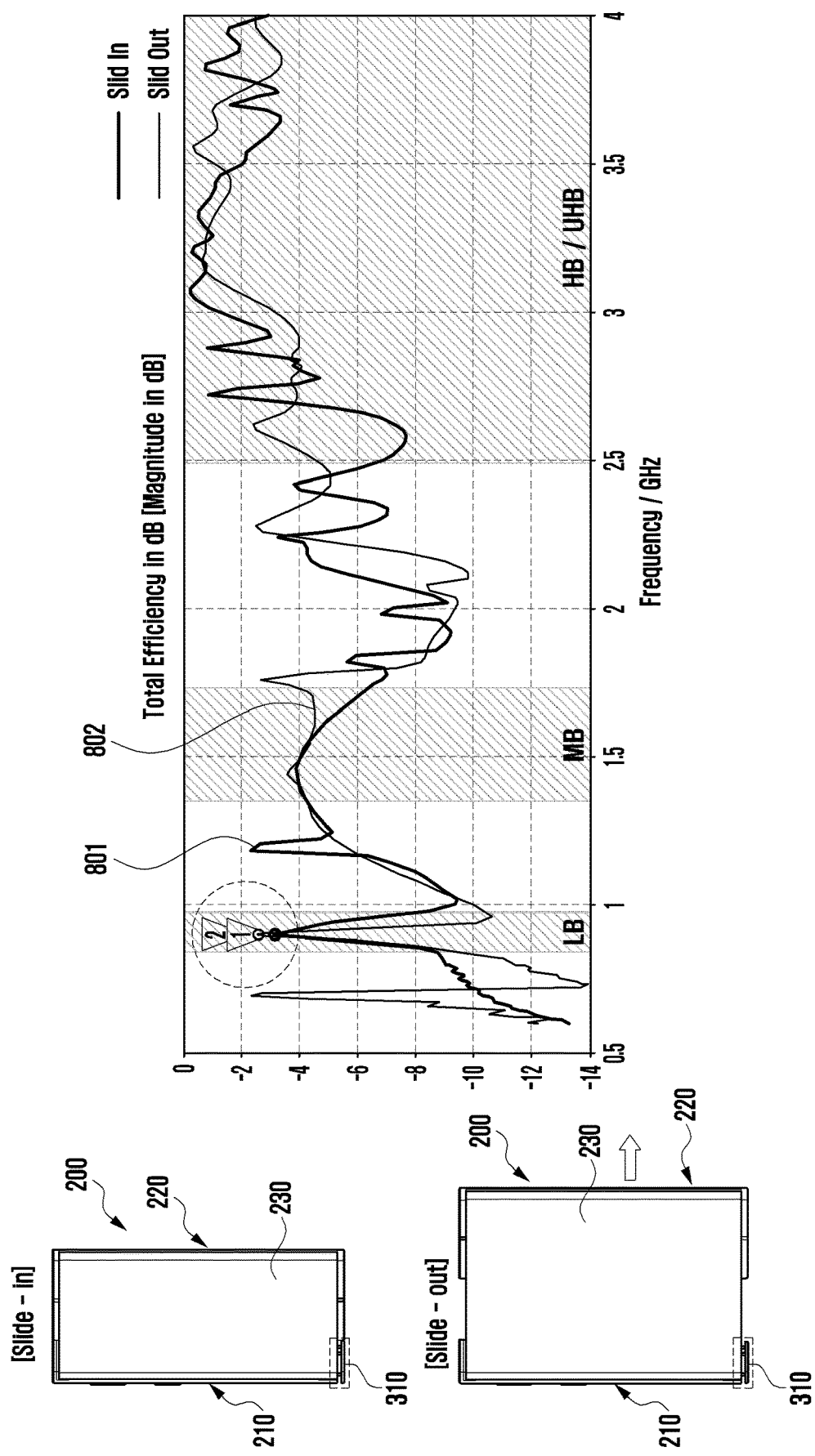
FIGS. 8A to 8C are graphs illustrating radiation performance of a first conductive portion and a second conductive portion used as an antenna in a slide-in state and a slide-out state according to an embodiment.
Figure 8B:
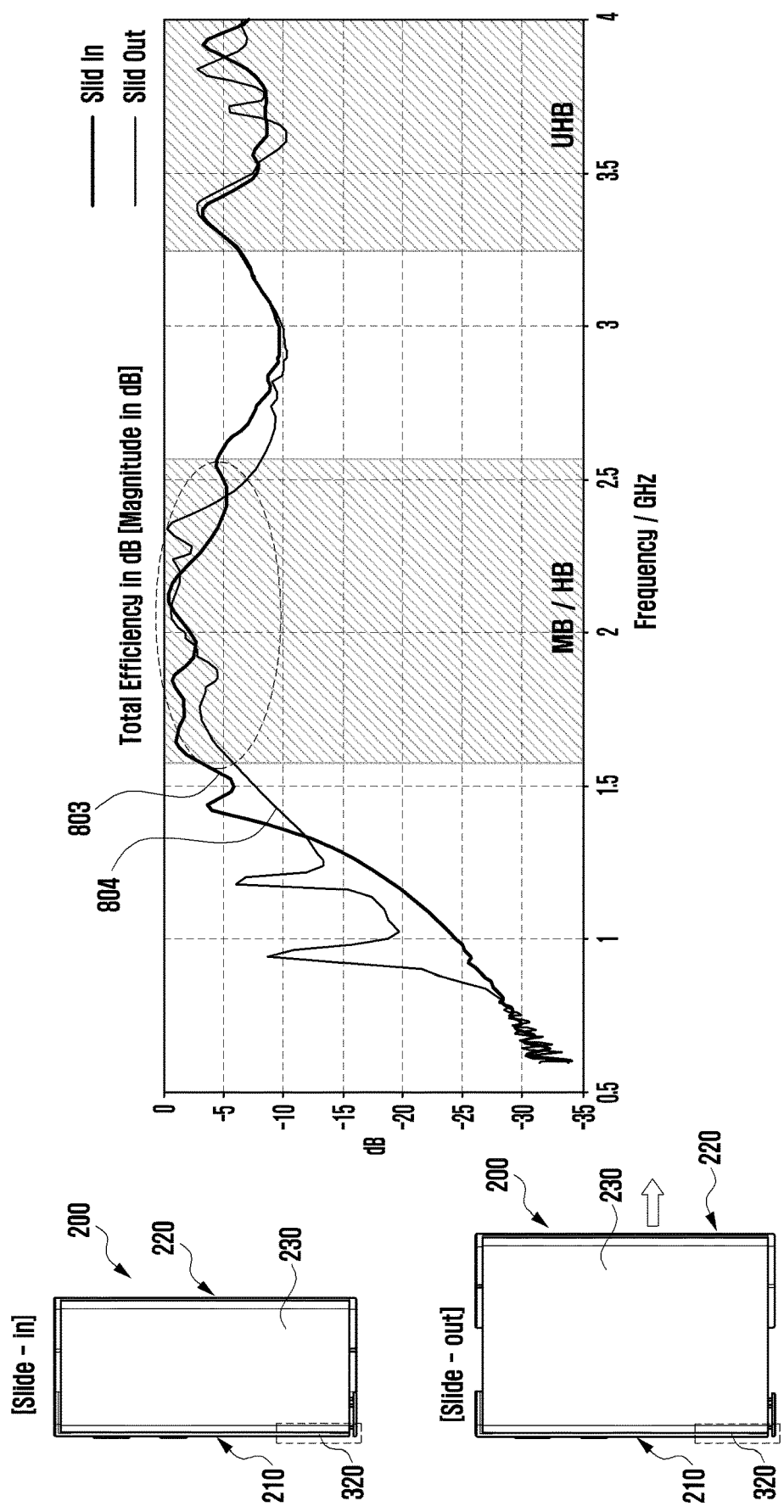
Figure 8C:
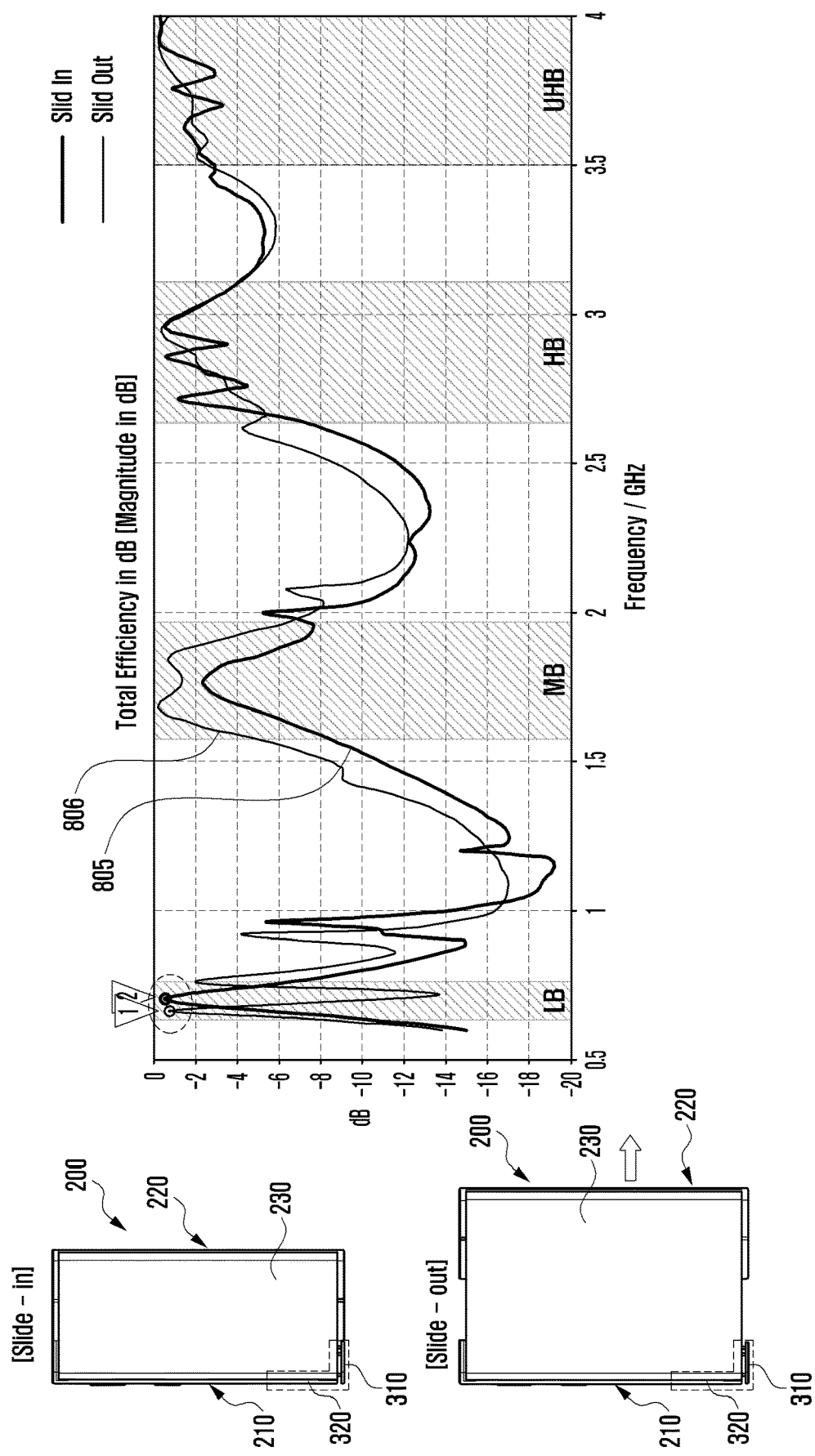

FIGS. 8A to 8C are graphs illustrating radiation performance of a first conductive portion and a second conductive portion used as an antenna in a slide-in state and a slide-out state according to an embodiment.

Referring to FIG. 8A, when only the first conductive portion 310 operates as an antenna, the "U" shape is operated in a low band (circular dotted line part) through sufficient electrical length. Further, no change in the radiation performance of the antenna occurs in the operating frequency band when the electronic device is in the slide-in state in graph 801 and when the electronic device is in the slide-out state in graph 802.

Referring to FIG. 8B, when only the second conductive portion 320 operates as an antenna, it is operated in the mid band and high band (the dotted line part of the oval) through sufficient electrical length of the "U" shape. No change in the radiation performance of the antenna occurs in the operating frequency band when the electronic device is in the slide-in state in graph 803 and when the electronic device is in the slide-out state in graph 804.

Referring to FIG. 8C, when the first conductive portion 310 and the second conductive portion 320 are operated together as an antenna, they operate in a low band, a mid band, a high band, and an ultra-high band. When the electronic device is in the slide-in state in 805 graph and in the slide-out state in 806 graph, a slight frequency deviation (about 40 MHz) occurred in the low band, but the level is negligible enough to be able to be overcome through a matching circuit or a tunable IC.

Figure 8D:
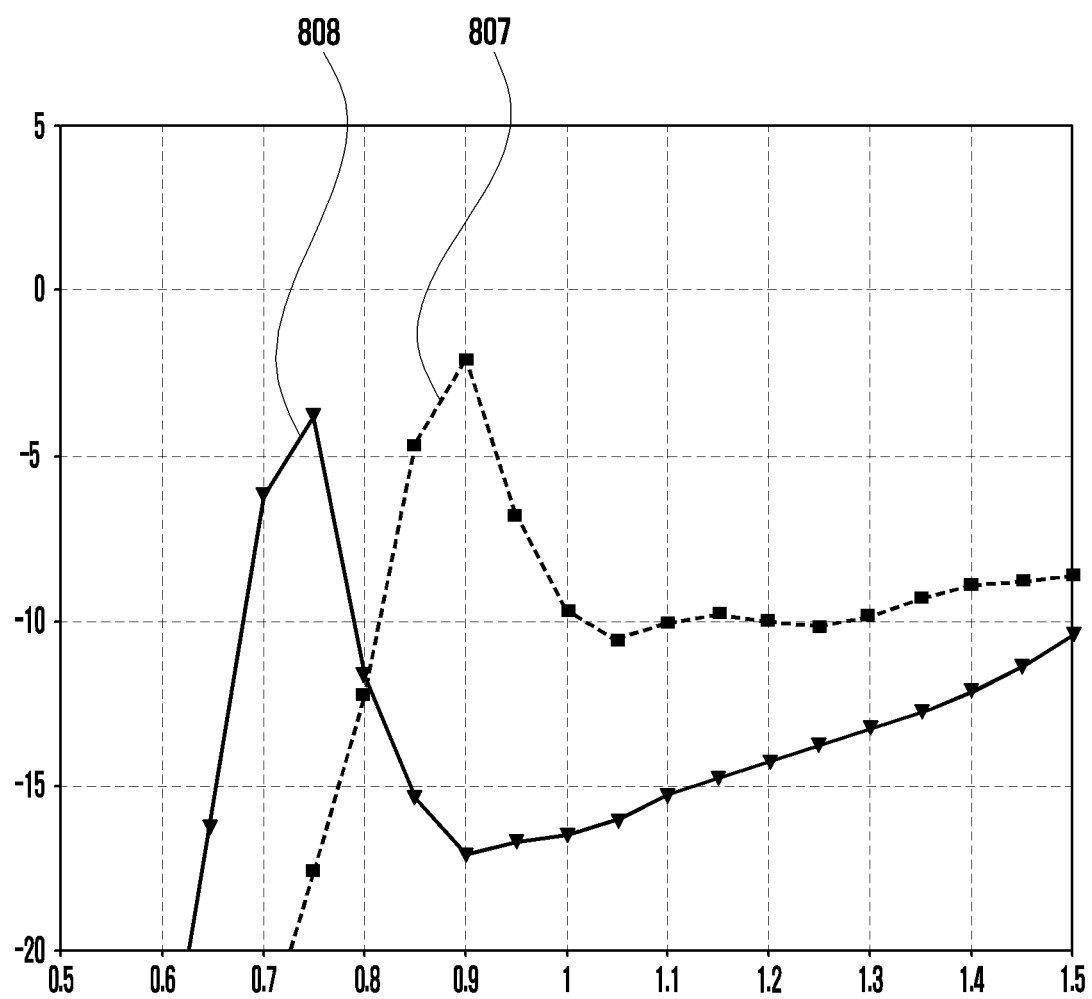
FIG. 8D is a graph illustrating operating frequency bands of a first conductive portion according to a presence or absence of a non-conductive portion according to an embodiment.

FIG. 8D is a graph illustrating operating frequency bands of a first conductive portion according to a presence or absence of a non-conductive portion according to an embodiment.

Referring to FIG. 8D, when the first conductive portion is used as an antenna and the non-conductive portion is applied in graph 808, a frequency shift of about 160 MHz occurs in a lower frequency band than when the non-conductive portion is not used in graph 808. The low band performance can also be secured by applying at least one capacitor having a specified capacitance value.

Figure 9A:
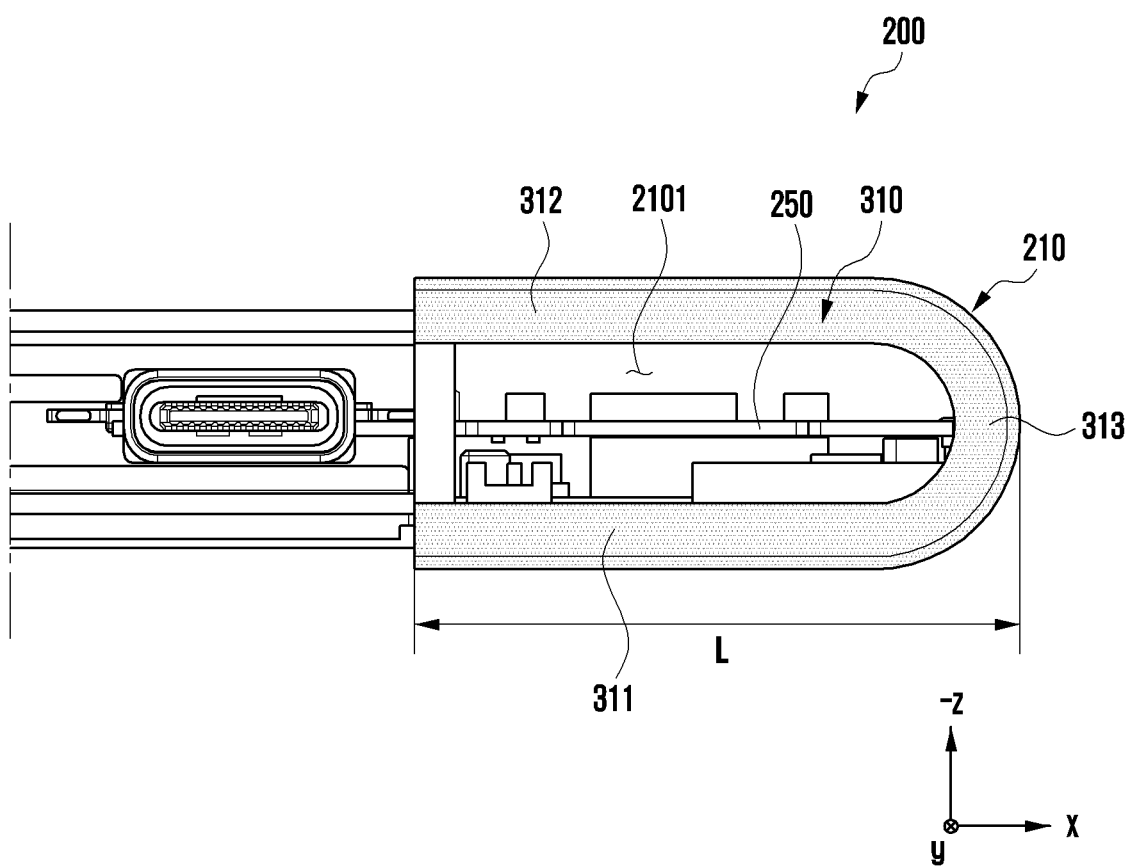
FIG. 9A illustrates an electronic device including a first conductive portion according to an embodiment.

FIG. 9A illustrates an electronic device including a first conductive portion according to an embodiment.

Referring to FIG. 9A, the electronic device 200 includes a first conductive portion 310 disposed on a first side surface of the first housing 210 (e.g., the first side surface 2111 of FIG. 2A). The first conductive portion 310 includes a first portion 311 arranged to have a specified length L at the first side 2111, a second portion 312 having a length L in a direction parallel to the first portion 311, and a third portion 313 connecting the first portion 311 and the second portion 312. The first portion 311, the second portion 312, and the third portion 313 may be integrally formed. The first portion 311 and the second portion 313 may be arranged in such a way that they are not parallel to each other and gradually move away from each other or become gradually closer to each other.

The antenna using the first conductive portion 310 may determine the operating frequency band according to the length L of the first portion 311 and the second portion 312 of the first conductive portion 310. For example, as the length L of the first conductive portion 310 increases, the operating frequency band may be moved to a lower frequency band. The first conductive portion 310 may be formed to have different lengths by changing only the length L of the first portion 311 or the second portion 312.

Figure 9B:
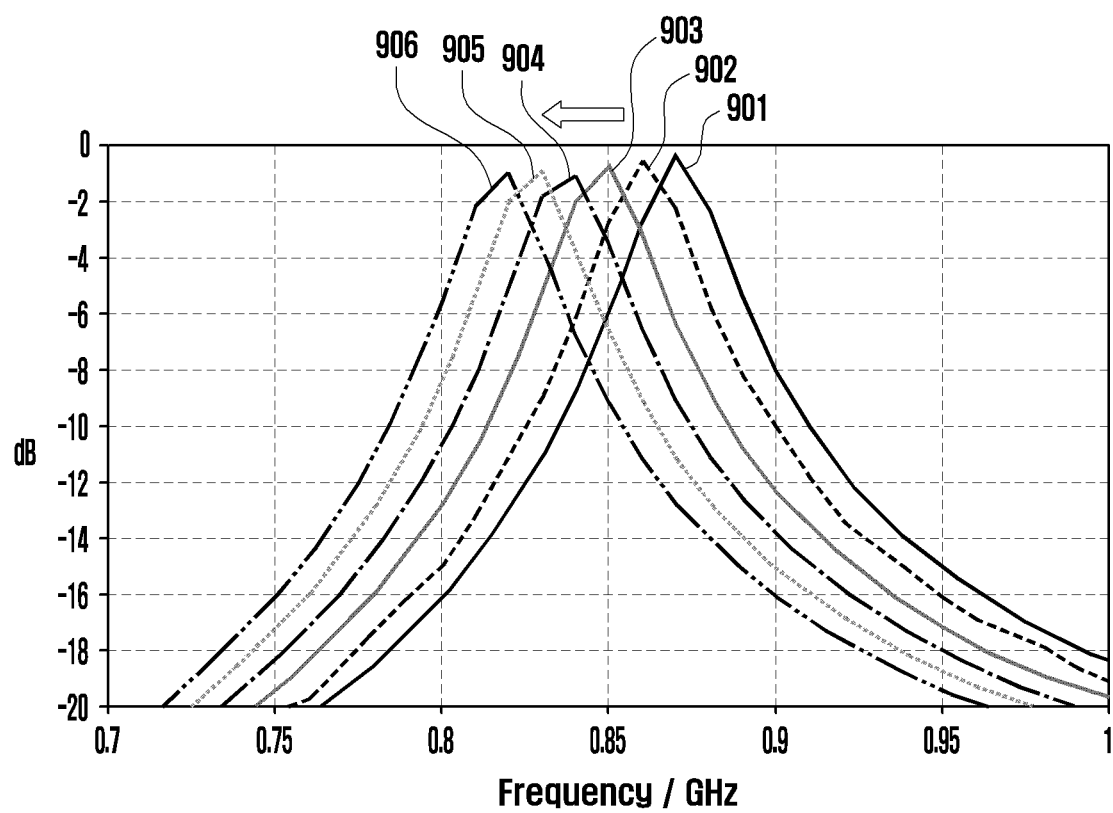
FIG. 9B is a graph illustrating a frequency change according to a length of the first conductive portion of FIG. 9A according to an embodiment.

FIG. 9B is a graph illustrating a frequency change according to a length of the first conductive portion of FIG. 9A according to an embodiment.

Referring to FIG. 9B, when the length L of the first conductive portion 310 is changed in the order of 24 mm in graph 901, 25 mm in graph 902), 26 mm in graph 903, 27 mm in graph 904, 28 mm in graph 905, and 29 mm in graph 906, the operating frequency band of the antenna is shifted to the low frequency band. In this case, the radiation performance is kept constant in all shifted frequency bands. Accordingly, even if the length L of the first conductive portion is determined to fit a desired operating frequency band, the radiation performance of the antenna is not reduced.

FIG. 10A illustrates the electronic device of FIG. 6B, taken along line 10a-10a, according to an embodiment.

Referring to FIG. 10A, the electronic device 200 includes a first conductive portion 310 disposed on a first side surface of the first housing 210 (e.g., the first side surface 2111 of FIG. 2A). The first conductive portion 310 may be spaced apart from the flexible display 230 by a specified distance g in the first space 2101 of the first housing 210. The first conductive portion 310, through the board 250 disposed in the first space 2101 and an electrical connection member 350 (e.g., a C-clip) disposed between the first connection pieces 3101 extending from the first conductive portion 310 may be electrically connected to the board 250. Alternatively, the first conductive portion 310 may be directly connected to the board 250 through the electrical connection member 350 without the first connection piece 3101, depending on the shape and function of the electrical connection member 350.

The antenna using the first conductive portion 310, in the first space 2101, may determine the operating frequency band according to the separation distance g between the first conductive portion 310 and the conductive plate of the flexible display 230 (e.g., the conductive plate 2304 of FIG. 6D). For example, as the separation distance g between the first conductive portion 310 and the flexible display 230 decreases, the operating frequency band may be moved to a lower frequency band.

Figure 10B:
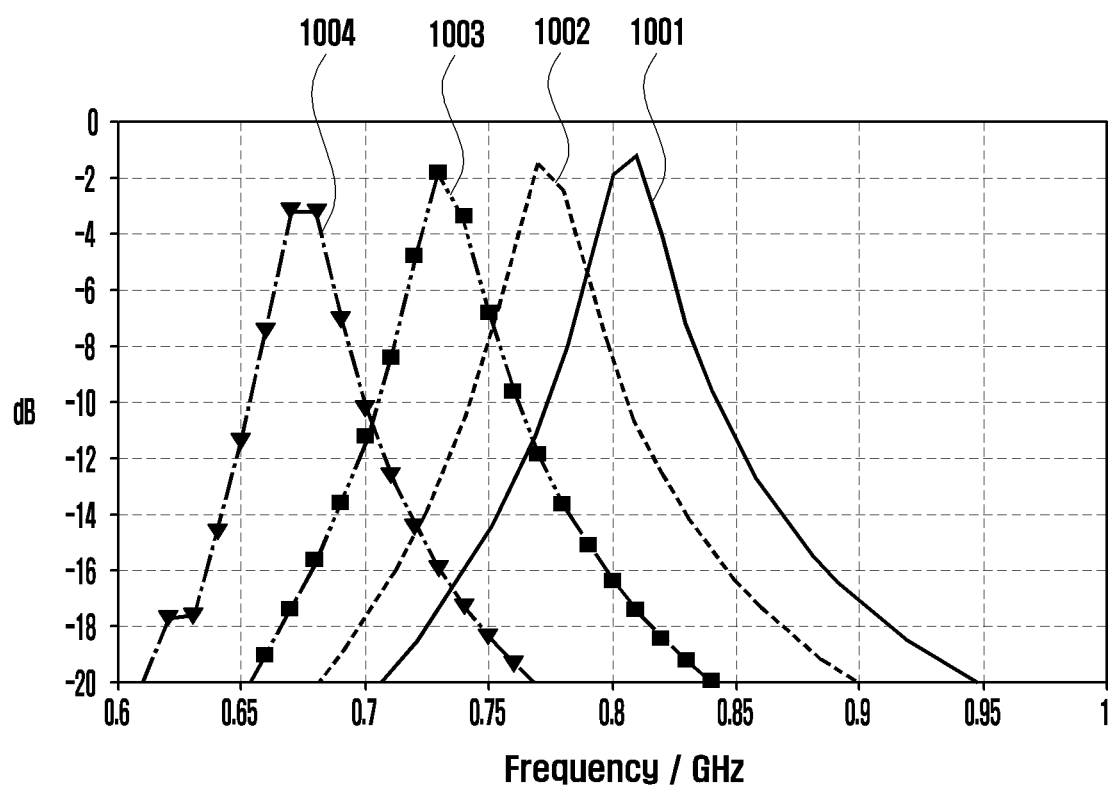
FIG. 10B is a graph illustrating a change in frequency according to a distance between the display and a first conductive portion of FIG. 10A according to an embodiment.

FIG. 10B is a graph illustrating a change in frequency according to a distance between the display and a first conductive portion of FIG. 10A according to an embodiment.

Referring to FIG. 10B, when the separation distance g of the first conductive portion 310 and the flexible display 230 are changed in order of 2.5 mm in graph 1001, 2.0 mm in graph 1002, 1.5 mm in graph 1003, and 1.0 mm in graph 1004 graph, the operating frequency band of the antenna is shifted to a low frequency band. In this case, the radiation performance is kept constant in all shifted frequency bands. Accordingly, even if the separation distance g between the first conductive portion 310 and the flexible display 230 is determined according to a desired operating frequency band, the radiation performance of the antenna is not reduced.

Figure 11A:
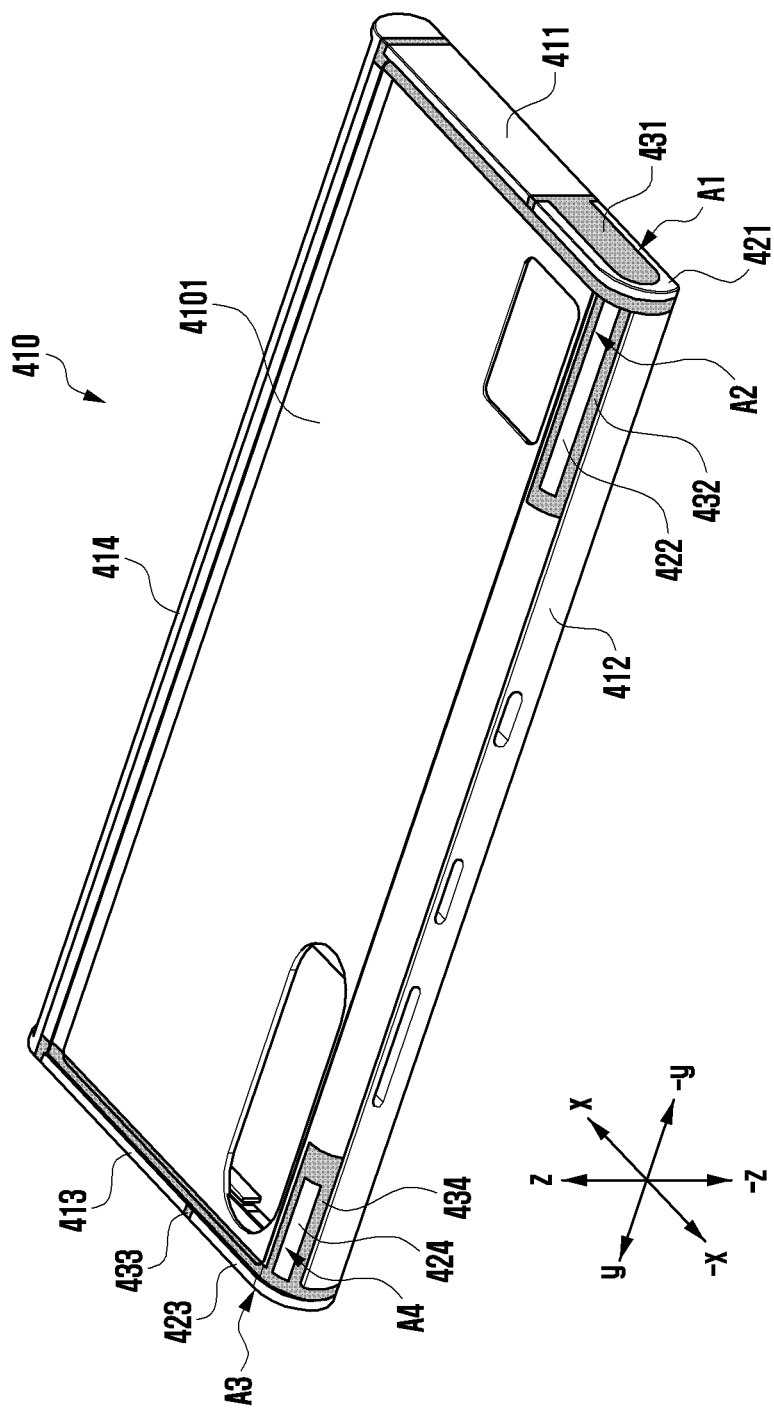
FIGS. 11A and 11B illustrate a housing including an antenna arrangement structure according to an embodiment.
Figure 11B:
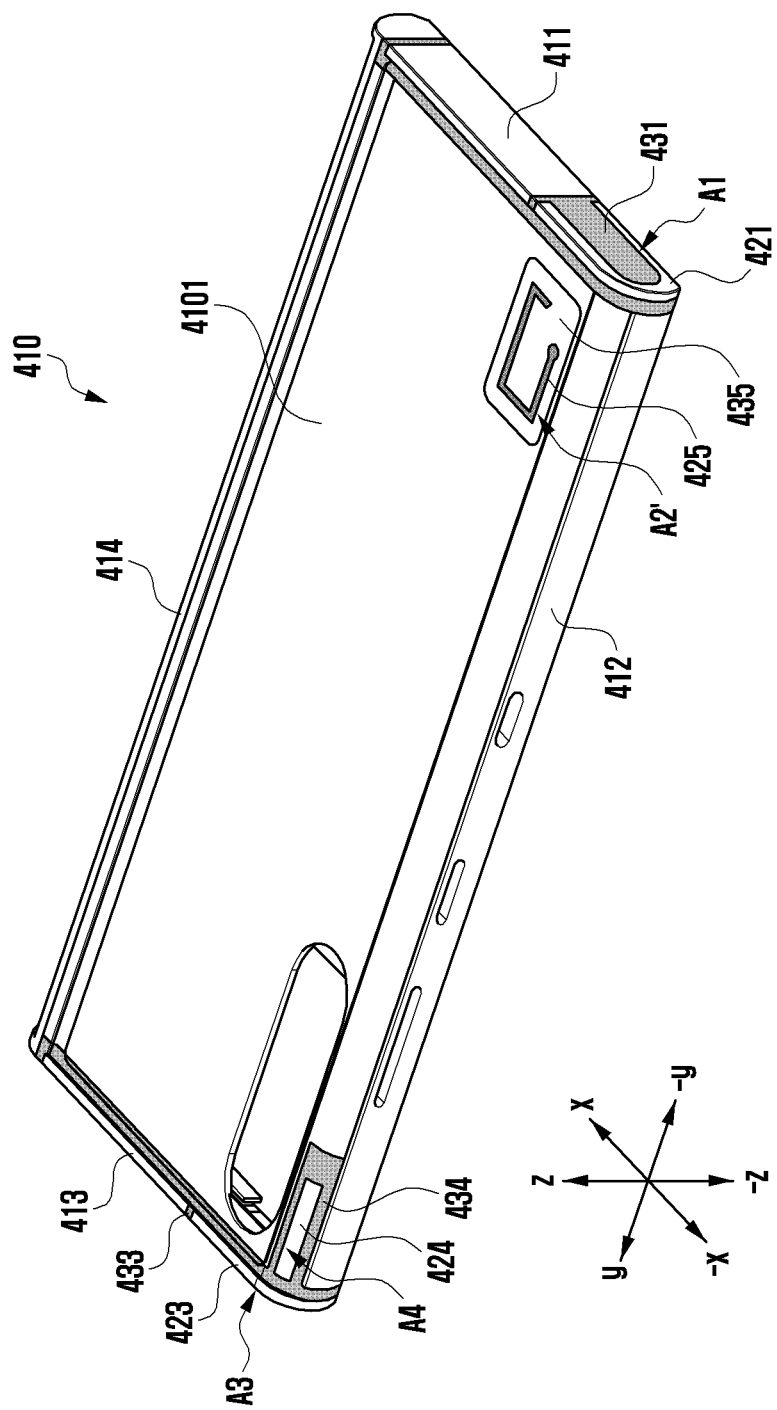

FIGS. 11A and 11B illustrate a housing including an antenna arrangement structure according to an embodiment.

The housing 410 of FIGS. 11A and 11B may be at least partially similar to the first housing 210 of FIG. 2A, or it may further include other embodiments of the housing.

Referring to FIG. 11A, the housing 410 includes a support member 4101 and side surfaces 411, 412, 413, and 414 formed along the edges of the support member 4101. The side surfaces 411, 412, 413, and 414 include a first side surface 411 having a first length in a first direction (x-axis direction), a second side surface 412 extended to have a second length longer than the first length in the second direction (y-axis direction) perpendicular from the first side surface 411, a third side surface 413 extending from the second side surface 412 to have a first length in a direction parallel to the first side surface 411, and a fourth side surface 414 extending from the third side surface 413 to the first side surface 411 in a direction parallel to the second side surface 412 and having a second length. At least one of the side surfaces 411, 412, 413, and 414 and the support member 4101 may be seamlessly connected without boundaries, and the connected portion may be formed in a curved shape.

The first side surface 411 operates as the first antenna A1, and includes a first conductive portion 421 and a first non-conductive portion 431. The first conductive portion 421 may have a "U" shape structure. The housing 410 operates as the second antenna A2 and includes a second conductive portion 422 and a second non-conductive portion 432. The second conductive portion 422 may be disposed on a boundary portion between the second side surface 412 and the support member 4101 or at least a portion of the support member 4101. The second conductive portion 422 may have an "I" shape, and may be segmented from other portions by the second non-conductive portion 432. The housing 410 operates as a third antenna A3 and includes a third conductive portion 423 and a third non-conductive portion 43 disposed on the third side surface 413. The third conductive portion 423 may have a "U" shape structure. The housing 410 operates as a fourth antenna A4 and includes a fourth conductive portion 424 and a fourth non-conductive portion 434 disposed on the second side 412. The fourth conductive portion 424 may be disposed at a boundary portion between the second side surface 412 and the support member 4101 or at least a portion of the support member 4101. The fourth conductive portion 424 may have an "I" shape.

In the description of the housing of FIG. 11B, the reference numerals assigned to the components are substantially the same as those of the housing of FIG. 11A, and a detailed description thereof may be omitted.

Referring to FIG. 11B, the housing 410 includes a conductive pattern 425 (e.g., an LDS) pattern of FIG. 11A that is replaced with the second conductive portion 424 and operates as a fifth antenna A2'. The conductive pattern 425 may be disposed through the fifth non-conductive portion 435 in the support member 4101 of the housing 410. The conductive pattern 425 may be disposed on the second side surface 412 of the housing 410, or it may be disposed including a boundary region between the second side surface 412 and the support member 4101.

The housing 410 of FIGS. 11A and 11B may be applied as a housing of a general bar type electronic device, at least one of a housing of a foldable type electronic device, a housing of a laptop computer, a housing of a tablet personal computer (PC), or a housing of a watch type electronic device.

Figure 12A:
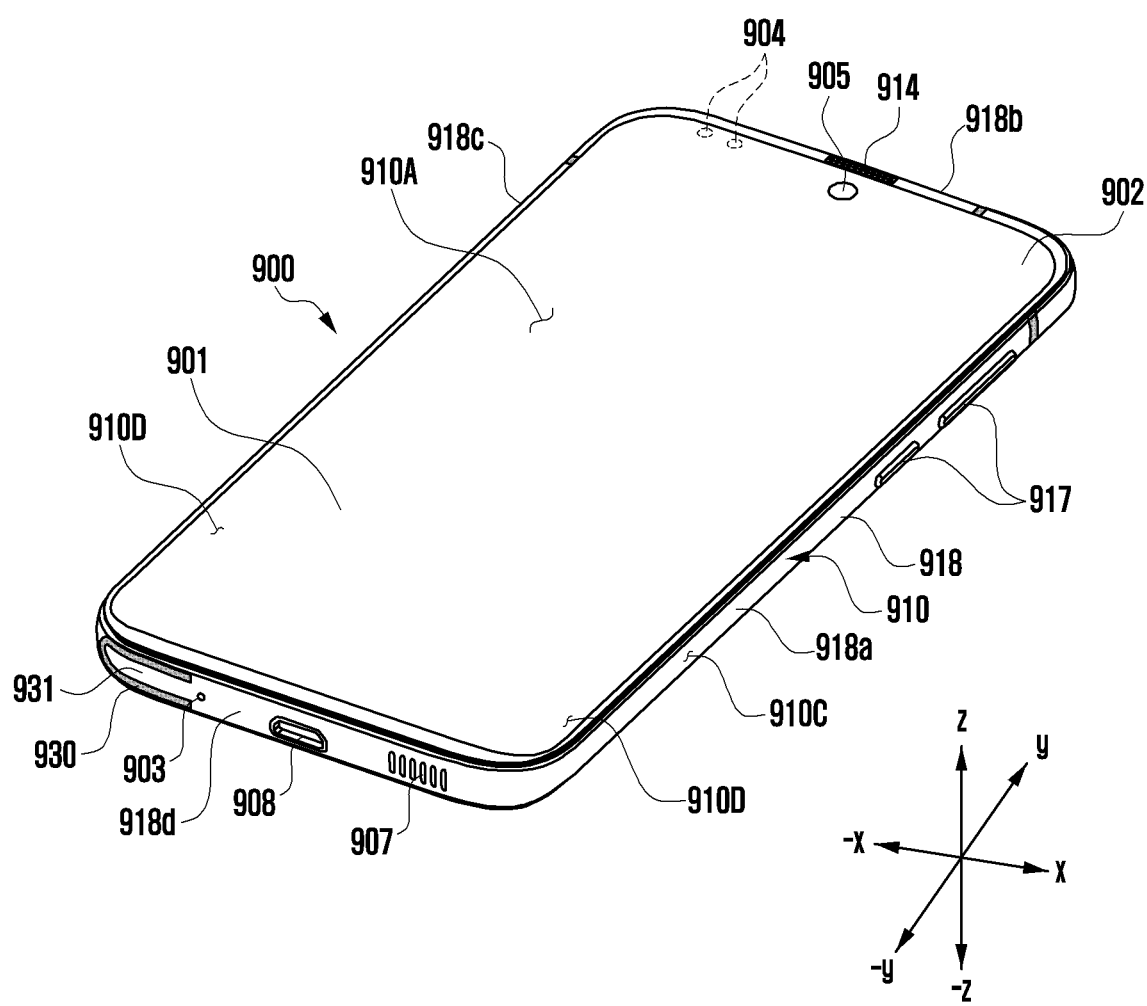
FIGS. 12A and 12B illustrate front and rear views of an electronic device including a first conductive portion according to an embodiment.
Figure 12B:
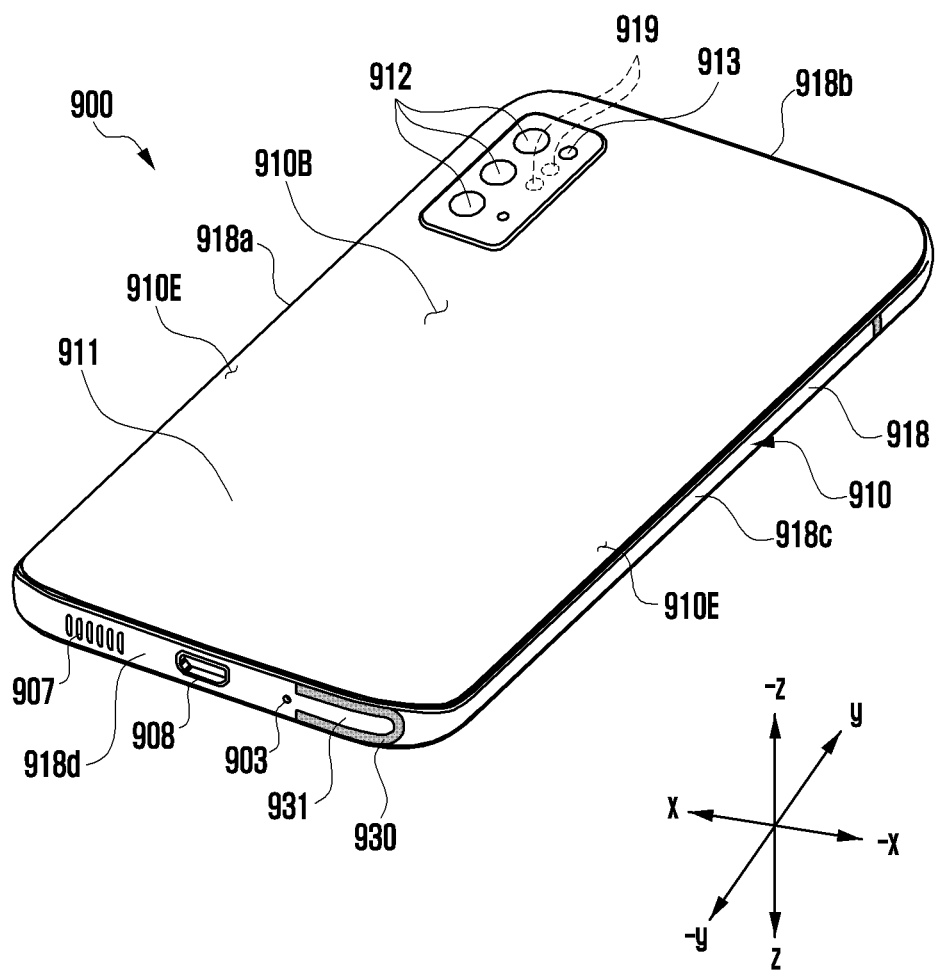

FIGS. 12A and 12B illustrate front and rear views of an electronic device including a first conductive portion according to an embodiment.

The electronic device of FIGS. 12A and 12B may be at least partially similar to the electronic device 101 of FIG. 1 or may further include other embodiments of the electronic device.

Referring to FIGS. 12A and 12B, an electronic device 900 includes a housing 910 including a first surface (or front surface) 910A, a second surface (or rear surface) 910B, and a side surface 910C enclosing a space between the first surface 910A and the second surface 910B. The housing may refer to a structure that forms part of the first surface 910A, the second surface 910B, and the side surface 910C of FIG. 12A. The first surface 910A may be formed by a front plate 902 (e.g., a glass plate including various coating layers or a polymer plate) at least a portion of which is substantially transparent. The second surface 910B may be formed by a substantially opaque rear plate 911. The rear plate 911 may be formed by coated or colored glass, ceramic, polymer, or metal (e.g., aluminum, STS, or magnesium), or a combination of at least two of the above materials. The side surface 910C is coupled to the front plate 902, and the rear plate 911 may be formed by a side bezel structure 918 (or "side surface member") including a metal and a polymer. The rear plate 911 and the side bezel structure 918 may also be integrally formed and include the same material (e.g., a metal material such as aluminum).

The front plate 902 includes a first region 910D that is curved and extends seamlessly from the first surface 910A toward the rear plate at both ends of the long edge of the front plate. The rear plate 911 may include a second region 910E that is curved and extends seamlessly from the second surface 910B toward the front plate at both ends of the long edge. The front plate 902 or the rear plate 911 may include only one of the first region 910D or the second region 910E. Alternatively, the front plate 902 may not include the first region and the second region, and may only include a flat plane disposed parallel to the second surface 910B. When viewed from the side of the electronic device 900, the side bezel structure 918 may have a first thickness (or width) at a side surface that does not include the first region 910D or the second region 910E as described above, and it may have a second thickness thinner than the first thickness at a side surface including the first region 910D or the second region 910E.

The electronic device 900 includes at least one of a display 901, an input device 903, sound output devices 907 and 914, sensor modules 904 and 919, camera modules 905 and 912, a key input device 917, an indicator, and a connector 908. Alternatively, the electronic device 900 may omit at least one of the components (e.g., the key input device 917 or an indicator) or additionally include other components.

The display 901 may be exposed through a substantial portion of the front plate 902. At least a portion of the display 901 may be exposed through the front plate 902 forming the first area 910D of the first surface 910A and the side surface 910C. The display 901 may be disposed adjacent to or coupled to a touch sensing circuit, a pressure sensor capable of measuring the intensity (pressure) of a touch, and a digitizer that detects a magnetic field type stylus pen. At least a portion of the sensor modules 904 and 919 and at least a portion of a key input device 917 may be located in the first area 910D and the second area 910E.

The input device 903 may include a microphone 903. The input device 903 may include a plurality of microphones 903 arranged to sense the direction of sound. The sound output devices 907 and 914 may include speakers. The sound output devices 907 and 914 may include an external speaker 907 and a receiver 914 for a call. The microphone 903, the sound output devices 907 and 914, and the connector 908 may be disposed at least in part in the internal space of the electronic device 900, and may be exposed to the external environment through at least one hole formed in the housing 910. A hole formed in the housing 910 may be commonly used for the microphone 903 and the sound output devices 907 and 914. The sound output devices 907 and 914 may include a speaker (e.g., a piezo speaker) that operates without a hole formed in the housing 910.

The sensor modules 904 and 919 may generate an electrical signal or data value corresponding to an internal operating state of the electronic device 900 or an external environmental state. The sensor modules 904 and 919 may include a first sensor module 904 (e.g., a proximity sensor) disposed on the first surface 910A of the housing 910, a second sensor module (e.g., a fingerprint sensor), and a third sensor module 919 (e.g., an HRM sensor) disposed on the second surface 910B of the housing 910. The fingerprint sensor may be disposed on the first surface 910A (e.g., a home key button) of the housing 910, a portion of the second surface 910B, and under the display 901. The electronic device 900 may further include at least one of a sensor module, e.g., a gesture sensor, a gyro sensor, a barometric pressure sensor, a magnetic sensor, an acceleration sensor, a grip sensor, a color sensor, an IR sensor, a biometric sensor, a temperature sensor, a humidity sensor, a proximity sensor, and an illuminance sensor.

The camera modules 905 and 912 may include a first camera module 905 disposed on the first surface 910A of the electronic device 900, a second camera module 912 disposed on the second surface 910B of the electronic device 900, and a flash 913. The camera modules 905 and 912 may include one or more lenses, an image sensor, and an ISP. The flash 913 may include, for example, an LED or a xenon lamp. In some embodiments, two or more lenses (wide-angle lens, ultra-wide-angle lens, or telephoto lens) and image sensors may be disposed on one side of the electronic device 900.

The key input device 917 may be disposed on the side surface 910C of the housing 910. Alternatively, the electronic device 900 may not include some or all of the above-mentioned key input devices 917 and the not included key input devices 917 may be implemented in other forms displayed on the display 901 as soft keys or the like. Additionally, the key input device 917 may be implemented using a pressure sensor included in the display 901.

The indicator may be disposed on the first surface 910A of the housing 910. The indicator may provide state information of the electronic device 900 in the form of a light (e.g., a light emitting device). The light emitting device may provide a light source that is interlocked with the operation of the camera module 905. Indicators may include LEDs, IR LEDs, and xenon lamps.

The connector hole 908 may include a first connector hole 908 capable of receiving a connector (e.g., a USB connector) for transmitting and receiving power and data to and from an external electronic device and a second connector hole (or earphone jack) capable of accommodating a connector for transmitting and receiving audio signals to and from an external electronic device.

Some of the camera modules 905 and 912, the camera module 905, some of the sensor modules 904 and 919, the sensor module 904, or the indicator may be arranged to be exposed through the display 901. For example, the camera module 905, the sensor module 904, or the indicator may be placed so that they come into contact with the external environment from the internal space of the electronic device 900 through an opening or transparent area perforated to the front plate 902 of the display 901. The area where the display 901 and the camera module 905 face each other may be formed as a transparent area having a predetermined transmittance as a part of an area displaying content. The transmissive region may be formed to have a transmittance in a range of about 5% to about 20%. Such a transmissive region may include an area overlapping an effective area (e.g., an angle of view area) of the camera module 905 through which light for generating an image by being imaged by an image sensor passes. The transmissive area of the display 901 may include an area having a lower pixel density than the surrounding area. The transmissive area may replace the opening. For example, the camera module 905 may include a UDC. Some sensor modules 904 may be arranged to perform their functions without being visually exposed through the front plate 902 in the internal space of the electronic device. For example, the area of the display 901 facing the sensor module may not need a perforated opening.

While the electronic device 900 is illustrated as a bar type or a plate type, the disclosure is not limited thereto. For example, the illustrated electronic device 900 may be a part of a foldable electronic device, a slidable electronic device, a stretchable electronic device, or a rollable electronic device. A foldable electronic device, a slidable electronic device, a stretchable electronic device, or a rollable electronic device, by bending deformation of the display (e.g., the display 330 of FIG. 3) being possible, may refer to an electronic device that may be at least partially folded, wound, rolled, or at least partially expanded or housed inside a housing (e.g., housing 910 of FIGS. 12A and 12B). A foldable electronic device, a slidable electronic device, a stretchable electronic device, and a rollable electronic device may expand a screen display area by unfolding a display or exposing a larger area of the display to the outside according to a user's needs.

The side surface member 918 includes a first side surface 918a having a first length in a designated direction (y-axis direction), a second side surface 918b extending in a direction perpendicular to the first side surface 918a (-x-axis direction) and having a second length shorter than the first length, a third side surface 918c extending from the second side surface 918b parallel to the first side surface 918a and having a first length, and a fourth side surface 918d extending from the third side surface 918c to the first side surface 918a and having a second length. The electronic device 900, at the fourth side surface 918d, includes a conductive portion 930 segmented from the surrounding conductive material through the non-conductive portion 931 in a direction parallel to the longitudinal direction (x-axis direction) of the fourth side surface 918d. The conductive portion 930 may be formed in substantially the same shape and manner as the first conductive portion 310 illustrated in FIG. 2A, and by being electrically connected to a wireless communication circuit (e.g., the wireless communication module 192 of FIG. 1) disposed in the internal space of the electronic device 900, may operate in at least one designated frequency band.

Figure 13A:
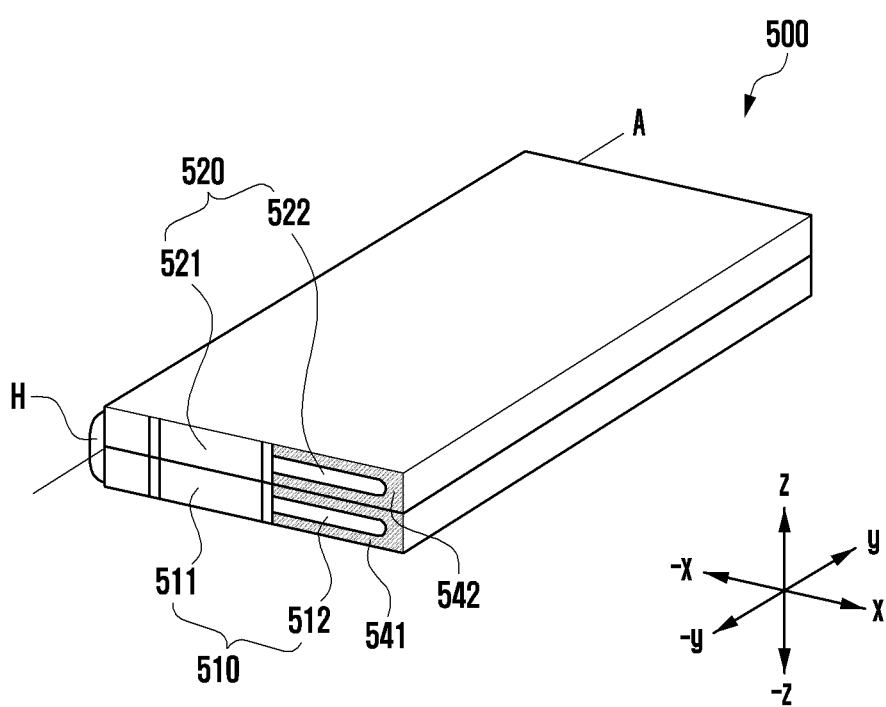
FIGS. 13A to 13C illustrate an electronic device including conductive portions according to an embodiment.
Figure 13B:
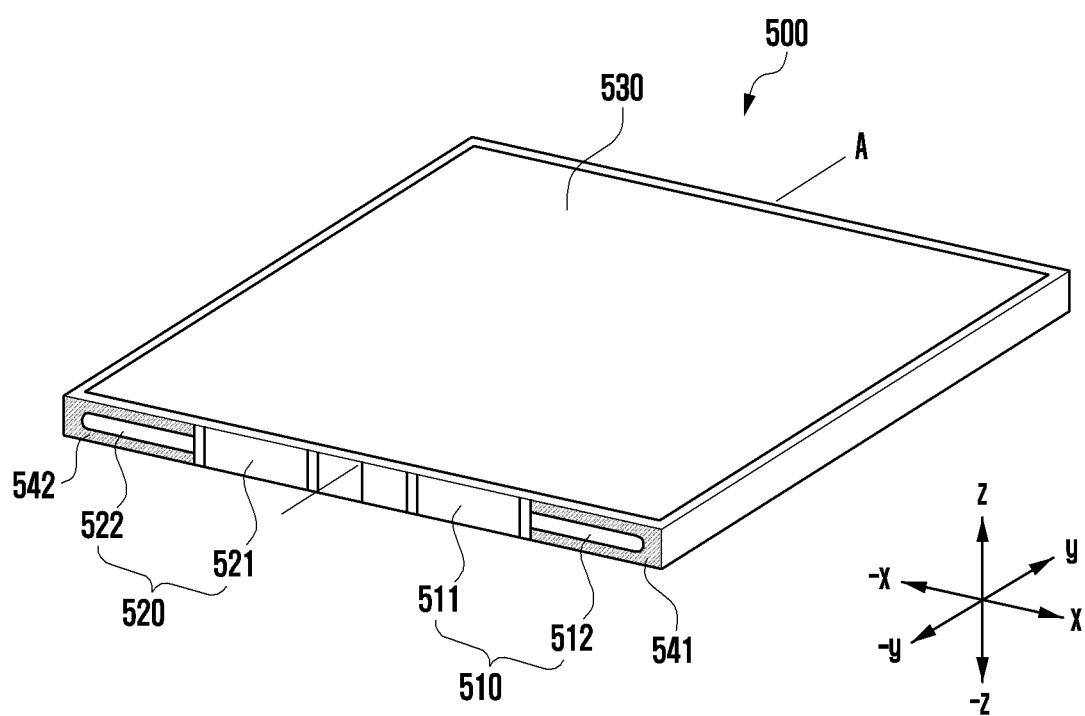
Figure 13C:
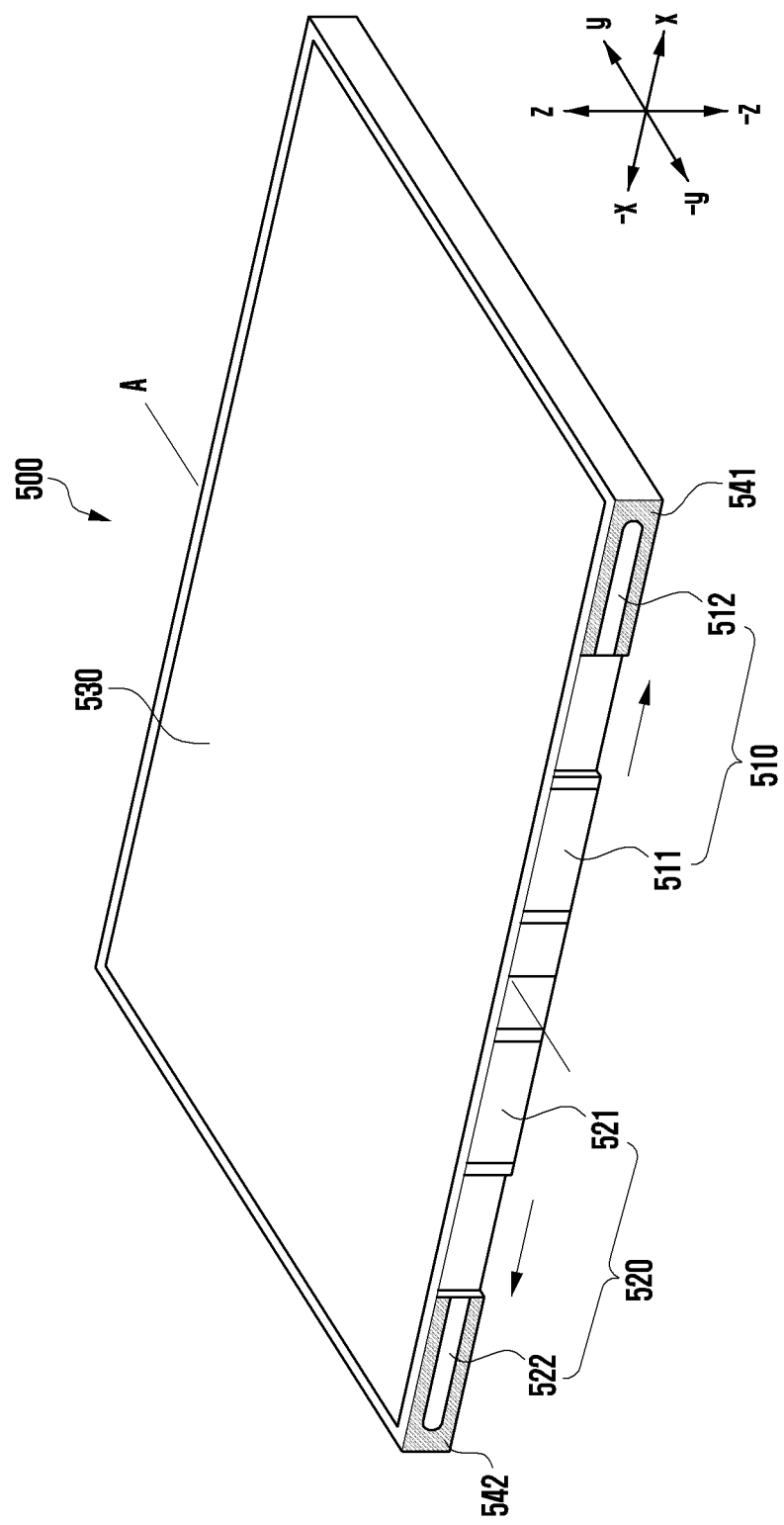

FIGS. 13A to 13C illustrate an electronic device including conductive portions according to an embodiment.

The electronic device 500 of FIGS. 13A to 13C may be at least partially similar to the electronic device 101 of FIG. 1 or may further include other embodiments of the electronic device.

Referring to FIGS. 13A to 13C, the electronic device 500 includes a first housing structure 510 and a second housing structure 520 coupled to the first housing structure 510 through a hinge device H and a flexible display 530 disposed to receive support from the first housing structure 510 and the second housing structure 520. The first housing structure 510 and the second housing structure 520 may be operated in a manner in which the flexible display 530 is folded invisibly from the outside with respect to each of the first housing structure 510 and the second housing structure 520 based on the folding axis A (e.g., an in-folding method). The first housing structure 510 and the second housing structure 520 may be operated in a folding method (e.g., an out-folding method) in which the flexible display 530 is viewed from the outside based on the folding axis A.

The first housing structure 510 includes a first housing 511 and a second housing 512 movably disposed in a first direction (e.g., an x-axis direction) from the first housing 511. The second housing structure 520 includes a third housing 521 and a fourth housing 522 movably arranged in a second direction (-x-axis direction) opposite to the first direction (e.g., x-axis direction) from the third housing 521.

When the first housing structure 510 and the second housing structure 520 are in an unfolded state, the second housing 512, by sliding by a specified distance from the first housing 511 in the first direction (x-axis direction) (slide-out), may induce at least a portion of the flexible display 530 accommodated in the inner space of the second housing 512 to be expanded to be visible from the outside. When the first housing structure 510 and the second housing structure 520 are in an unfolded state, the fourth housing 522 being slid-out from the third housing 521 by a specified distance in the second direction (−x-axis direction), may induce at least a portion of the flexible display 530 accommodated in the inner space of the fourth housing 522 to expand so that it can be seen from the outside.

The electronic device 500 may include conductive portions 541 and 542 disposed on at least a portion of the side surface of the second housing 512 or at least a portion of the side surface of the fourth housing 522 or on both. The conductive portions 541 and 542 may be disposed in substantially the same manner as the conductive portions 310 and 340 of FIG. 2A as described above (e.g., the conductive portions 310 and 340 of FIG. 2A), and may be used as an antenna of the electronic device 500. The conductive portions 541 and 542 may be disposed on sides of the first housing 511 and/or the third housing 521.

Figure 14:
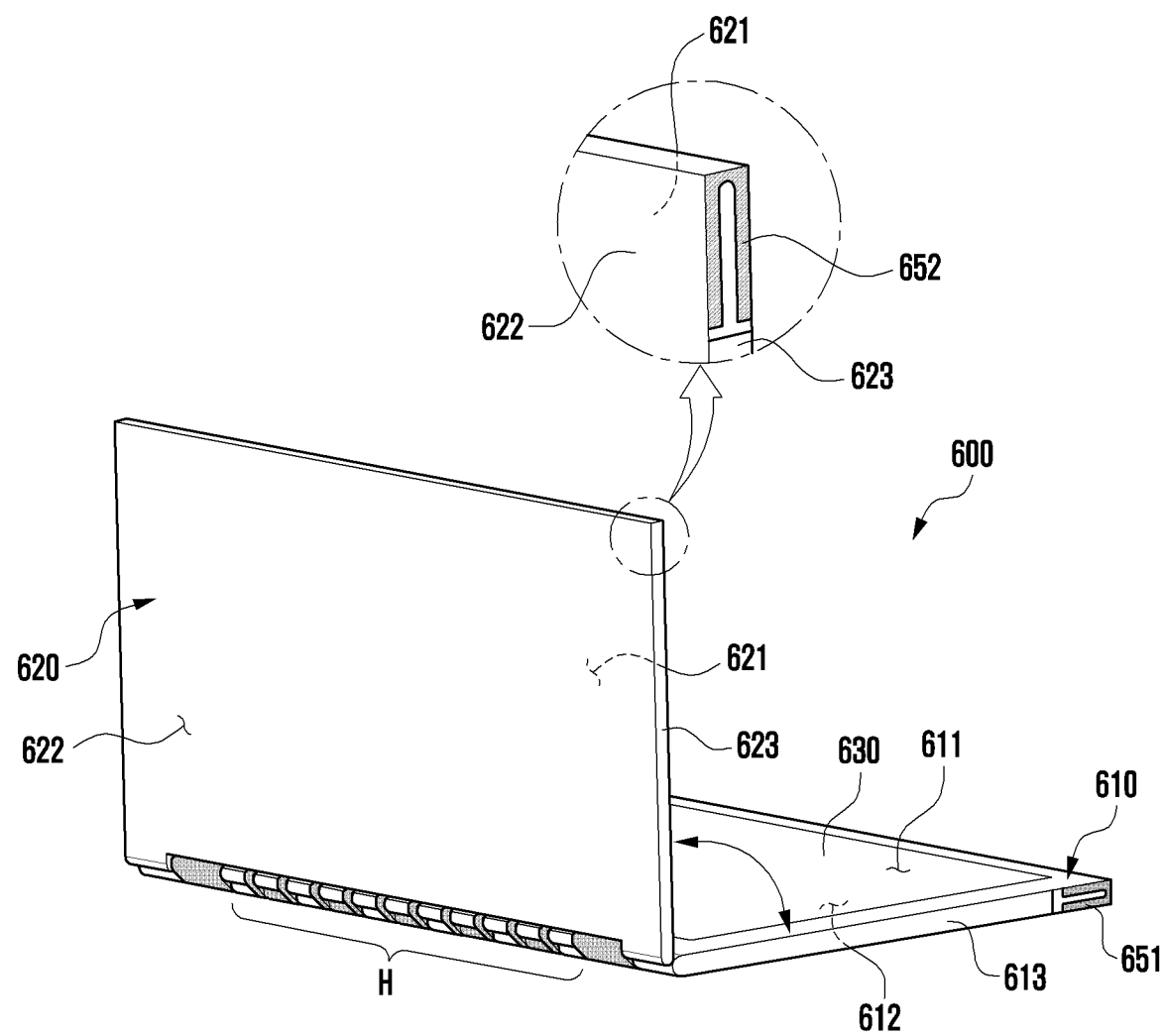
FIG. 14 illustrates an electronic device including conductive portions according to an embodiment.

FIG. 14 illustrates an electronic device including conductive parts according to an embodiment.

The electronic device 600 of FIG. 14 may be at least partially similar to the electronic device 101 of FIG. 1, or it may further include other embodiments of the electronic device.

Referring to FIG. 14, the electronic device 600 includes a first housing 610 and a second housing 620 foldably coupled to the first housing 610 through a hinge device H. The first housing 610 includes a touch display 630 as an input/output device. The touch display 630 may be replaced with a plurality of key buttons (e.g., a keypad assembly) as an input device. The second housing 620 may include another display.

The first housing 610 includes a first surface 611, a second surface 612 facing in the opposite direction to the first surface 611, and a first side surface 613 surrounding the space between the first surface 611 and the second surface 612. The second housing 620 includes a third surface 621, a fourth surface 622 facing in the opposite direction to the third surface 621, and a second side surface 623 surrounding the space between the third surface 621 and the fourth surface 622. The electronic device 600 may be operated such that the first surface 611 and the third surface 621 face each other in the folded state. The electronic device 600 may also be operated such that the second surface 612 and the fourth surface 622 face each other in the folded state.

The electronic device 600 includes conductive portions 651 and 652 disposed through at least a portion of the first side surface 613 and/or at least a portion of the second side surface 623. The conductive portions 651 and 652 may be disposed in substantially the same manner as the conductive portions 310 and 340 of FIG. 2A, as described above, wherein they may be used as an antenna for the electronic device 600.

According to an embodiment, an electronic device (e.g., the electronic device 200 of FIG. 2A) includes a first conductive portion (e.g., first conductive portion 310 of FIG. 2A) disposed through at least a portion of a side surface (e.g., first side surface 2111 of FIG. 2A), a flexible display (e.g., the flexible display 230 of FIG. 2A) disposed to be supported by the first housing and the second housing, and including at least a partially variable display area when transitioning from a slide-in state to a slide-out state, and a wireless communication circuit configured to either or both transmit or receive a wireless signal in at least one frequency band through the first conductive portion (e.g., the wireless communication module 192 of FIG. 1), wherein the first conductive portion includes a first portion disposed to have a first length along the first direction, a second portion spaced apart from the first portion at a specified interval and disposed to have a second length in the first direction, and a third portion connecting one end of the first portion and one end of the second portion, and wherein the at least one frequency band may be determined through a third length extending from the first portion through the third portion to the second portion.

The side surface may include a first side surface formed along the first direction, a second side surface extending from the first side surface in a second direction perpendicular to the first direction, and a third side surface extending along the first direction from the second side surface. The first conductive portion may be disposed on the first side surface.

The first portion may be arranged to have a specified width along an upper edge of the first side surface.

The second portion may be arranged to have a specified width along a lower edge of the first side surface.

The third portion may be formed in a shape corresponding to the outer surface of the second side surface.

The first portion and the second portion may be formed to have substantially the same length.

The third portion may be formed in a curved shape or a straight shape.

The electronic device may further include a second conductive portion disposed on at least a portion of the side surface and electrically connected to the wireless communication circuit.

The electronic device may further include a wireless communication circuit, at least one switching circuit disposed in an electrical path connecting the first conductive portion and the second conductive portion, and at least one processor for controlling the at least one switching circuit, wherein the at least one processor may control the at least one switching circuit to operate in at least one frequency band through the first conductive portion or the second conductive portion or through both.

The at least one processor may control the switching circuit based on state information of the electronic device.

The electronic device may further include, in the side surface, a third conductive portion disposed to support at least a portion of the flexible display and electrically separated from the first conductive portion and the second conductive portion.

The first conductive portion, the second conductive portion, and the third conductive portion may be connected through a non-conductive portion.

The electronic device may further include at least one conductive pattern disposed in the first space and electrically connected to the wireless communication circuit.

At least a portion of the flexible display is supported through at least a portion of the side surface and the first conductive portion may be electrically disconnected from a portion supporting the flexible display on the side surface.

The flexible display, in the slide-in state, may include a first area arranged to be visible from the outside and a second region extending from the second region and at least partially accommodated in the second space of the second housing so as not to be seen from the outside.

According to an embodiment, an electronic device includes a first side surface comprising a first conductive portion disposed along a first direction, a second side surface extending from the first side surface in a second direction perpendicular to the first direction, a third side surface extending in the first direction from the second side surface, a housing including an inner space formed through a fourth side surface extending from the third side surface to the first side surface, and a wireless communication circuit arranged in a display disposed to be supported by the housing and the interior space and configured to either or both transmit or receive a wireless signal in at least one frequency band via the first conductive portion, wherein the first conductive portion includes a first portion arranged to have a first length along the first direction, a second portion disposed to be spaced apart from the first portion at a predetermined interval and disposed to have a second length in the first direction, and a third portion connecting one end of the first portion and one end of the second portion, and wherein the at least one frequency band may be determined through a third length extending from the first portion through the third portion to the second portion.

The first portion may be arranged to have a specified width along an upper edge of the first side surface.

The second portion may be arranged to have a specified width along a lower edge of the first side surface.

The third portion may be arranged to have a specified width along a side edge of the first side surface.

The third portion may be formed in a shape corresponding to the outer surface of the second side surface.

An electronic device according to the above-described embodiments of the disclosure provides improved radiation performance by using at least some area of the housing in which the sliding actuation structure and the display support structure are absent and by using a conductive portion formed to have sufficient electrical length to operate in a low band as an antenna. In addition, through a switching structure in which the antenna operates according to the state of the electronic device (e.g., whether a user grips the electronic device), it is possible to help reduce the deterioration of the radiation performance of the antenna.

The above-described embodiments of the disclosure are merely provided as specific examples to provide an easy explanation of the technical contents according to the embodiments of the disclosure and to help an understanding of the embodiments of the disclosure. The above-described embodiments are not intended to limit the scope of the disclosure. Accordingly, the scope of the various embodiments of the disclosure should be construed as all changes or modifications derived from the technical ideas of various embodiments of the disclosure in addition to the embodiments disclosed herein.

While the disclosure has been particularly shown and described with reference to embodiments thereof, it will be understood by those skilled in the art that various changes in form and details may be made therein without departing from the scope of the subject matter as defined by the appended claims and their equivalents.

What is claimed is:

1. An electronic device, comprising:
    a first housing including a first conductive portion disposed through at least a portion of a side surface and including a first space;
    a second housing coupled to be slidable along a first direction from the first housing;
    a flexible display disposed to be supported by the first housing and the second housing and including at least a partially variable display area when transitioning from a slide-in state to a slide-out state; and
    a wireless communication circuit disposed in the first space and configured to transmit or receive a wireless signal in at least one frequency band through the first conductive portion,
    wherein the first conductive portion comprises:
        a first portion having a first length along the first direction,
        a second portion spaced apart from the first portion at a predetermined interval and having a second length in the first direction, and
        a third portion connecting to a first end of the first portion and a first end of the second portion,
    wherein the side surface comprises a second side surface extending in a second direction perpendicular to the first direction,
    wherein the third portion has a curved shape corresponding to an outer surface of the second side surface, and
    wherein the at least one frequency band is determined based on a third length extending from the first portion, through the third portion, to the second portion.

2. The electronic device of claim 1, wherein the side surface further comprises:
    a first side surface formed along the first direction, wherein the second side surface extends from the first side surface in the second direction perpendicular to the first direction; and
    a third side surface extending along the first direction from the second side surface,
    wherein the first conductive portion is arranged on the first side surface.

3. The electronic device of claim 2, wherein the first portion has a specified width along an upper edge of the first side surface.

4. The electronic device of claim 2, wherein the second portion has a specified width along a lower edge of the first side surface.

5. The electronic device of claim 1, wherein the first length and the second length are substantially equal.

6. The electronic device of claim 1, further comprising a second conductive portion disposed on at least a portion of the side surface and electrically connected to the wireless communication circuit.

7. The electronic device of claim 6, further comprising:
    a switching circuit disposed in an electrical path connecting the first conductive portion and the second conductive portion; and
    a processor controlling the switching circuit,
    wherein the processor controls the switching circuit to operate in the at least one frequency band through at least one of the first conductive portion or the second conductive portion.

8. The electronic device of claim 7, wherein the processor controls the switching circuit based on state information of the electronic device.

9. The electronic device of claim 6, further comprising a third conductive portion electrically separated from the first conductive portion and the second conductive portion in the side surface.

10. The electronic device of claim 9, wherein the first conductive portion, the second conductive portion, and the third conductive portion are connected through a non-conductive portion.

11. The electronic device of claim 1, further comprising at least one conductive pattern disposed in the first space and electrically connected to the wireless communication circuit.

12. The electronic device of claim 1, wherein at least a portion of the flexible display is supported by a portion of the side surface, and wherein the first conductive portion is electrically disconnected from the portion of the side surface supporting the flexible display.

13. The electronic device of claim 1, wherein the flexible display comprises a first area visible from outside of the electronic device, and a second area extending from the first area and accommodated in a second space of the second housing so as not to be seen from the outside of the electronic device in the slide-in state.

14. An electronic device, comprising:

a first side surface including a first conductive portion disposed along a first direction;

a second side surface extending from the first side surface in a second direction perpendicular to the first direction;

a third side surface extending, in the first direction, from the second side surface;

a housing including an inner space formed through a fourth side surface extending from the third side surface to the first side surface;

a display; and a wireless communication circuit disposed in the inner space and configured to transmit or receive a wireless signal in at least one frequency band through the first conductive portion, wherein the first conductive portion comprises:

a first portion having a first length along the first direction;

a second portion spaced apart from the first portion at a predetermined interval and having a second length in the first direction; and a third portion connecting to a first end of the first portion and a first end of the second portion, wherein the third portion has a curved shape corresponding to an outer surface of the second side surface, and wherein the at least one frequency band is determined based on a third length extending from the first portion, through the third portion, to the second portion.

15. The electronic device of claim 14, wherein the first portion has a specified width along an upper edge of the first side surface.

16. The electronic device of claim 14, wherein the second portion has a specified width along a lower edge of the first side surface.

17. The electronic device of claim 14, wherein the third portion has a specified width along a side edge of the first side surface.

* * * * *